(12) United States Patent
Nomura et al.

(10) Patent No.: US 8,701,420 B2
(45) Date of Patent: Apr. 22, 2014

(54) GAS TURBINE CONTROL METHOD AND DEVICE

(75) Inventors: Masumi Nomura, Yokohama (JP); Kotaro Miyauchi, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1042 days.

(21) Appl. No.: 12/673,932

(22) PCT Filed: Feb. 23, 2009

(86) PCT No.: PCT/JP2009/053779
§ 371 (c)(1), (2), (4) Date: Apr. 15, 2010

(87) PCT Pub. No.: WO2009/107818
PCT Pub. Date: Sep. 3, 2009

(65) Prior Publication Data
US 2010/0199680 A1    Aug. 12, 2010

(30) Foreign Application Priority Data
Feb. 28, 2008 (JP) ................................. 2008-048835

(51) Int. Cl.
*F02C 9/52* (2006.01)
*F02C 9/00* (2006.01)

(52) U.S. Cl.
USPC .......................... 60/773; 60/39.27; 60/39.281

(58) Field of Classification Search
USPC ................... 60/39.281, 39.27, 728, 773, 772; 701/100
See application file for complete search history.

(56) References Cited

U.S. PATENT DOCUMENTS

| 6,721,631 B2 * | 4/2004 | Shimizu et al. ............... 700/287 |
| 6,810,655 B2 | 11/2004 | Davis, Jr. et al. |
| 2005/0107942 A1 | 5/2005 | Nomura et al. |
| 2006/0234171 A1 | 10/2006 | Tanabe et al. |
| 2007/0089395 A1 | 4/2007 | Fujii et al. |
| 2009/0125207 A1 | 5/2009 | Nomura et al. |

FOREIGN PATENT DOCUMENTS

CN    1854609 A    11/2006

(Continued)

OTHER PUBLICATIONS

JP 2003-293794 machine translation done Jun. 19, 2013.*

(Continued)

*Primary Examiner* — Ted Kim
(74) *Attorney, Agent, or Firm* — Westerman, Hattori, Daniels & Adrian, LLP

(57) ABSTRACT

A gas turbine control device having a gas turbine control unit for the gas turbine operation control that computes adjustment increments regarding at least one of the airflow rate into the combustor and the pilot ratio, and makes revisions to the actuating variables comprising the airflow rate and the pilot ratio so that the actuating variables are contrasted with the status signals and the variables are modified toward initial design conditions. The gas turbine control unit resets the revisions made to the actuating variables in a case where the level of the combustion vibration is restrained below the predetermined control criterion for a predetermined time span, and the gas turbine is operated under the control settings of the initial design stage.

6 Claims, 9 Drawing Sheets

(56) References Cited

FOREIGN PATENT DOCUMENTS

| | | |
|---|---|---|
| CN | 1932264 A | 3/2007 |
| JP | 9-269107 A | 10/1997 |
| JP | 2003-232230 A | 8/2003 |
| JP | 2003-293794 A | 10/2003 |
| JP | 2003-314301 A | 11/2003 |
| JP | 2003-314305 A | 11/2003 |
| JP | 2005-155590 A | 6/2005 |
| JP | 2006-183652 A | 7/2006 |

OTHER PUBLICATIONS

Notification of Transmittal of Copies of Translation of the International Preliminary Report on Patentabililty (Form PCT/IB/338) of International Application No. PCT/JP2009/053779 mailed Oct. 21, 2010 with Forms PCT/IB/373, PCT/ISA/237, and PCT/IB/326.
Notice of Allowance dated May 14, 2012, issued in corresponding Japanese application No. 2008-048835, with English Translation.
Notice of Allowance dated Aug. 14, 2012, issed in corresponding Korean application No. 2010-7003188, with English translation.

* cited by examiner

FIG. 7

| Time point | Manipulated variable(s) (actuating variable) | | Uncontrollable state variable(s) | | 1st frequency band | 2nd frequency band | ... | n-th frequency band |
|---|---|---|---|---|---|---|---|---|
| | Bypass valve opening | Pilot ratio | Ambient temperature | MW | | | | |
| $t_1$ | $x_{11\text{-}1}$ | $x_{12\text{-}1}$ | $x_{21\text{-}1}$ | $x_{22\text{-}1}$ | $Y_{i1\text{-}1}$ | $Y_{i2\text{-}1}$ | ... | $Y_{in\text{-}1}$ |
| $t_2$ | $x_{11\text{-}2}$ | $x_{12\text{-}2}$ | $x_{21\text{-}2}$ | $x_{22\text{-}2}$ | $Y_{i1\text{-}2}$ | $Y_{i2\text{-}2}$ | ... | $Y_{in\text{-}2}$ |
| ... | ... | ... | ... | ... | ... | ... | ... | ... |
| $t_{1n}$ | $x_{11\text{-}n}$ | $x_{12\text{-}n}$ | $x_{21\text{-}n}$ | $x_{22\text{-}n}$ | $Y_{i1\text{-}n}$ | $Y_{i2\text{-}n}$ | ... | $Y_{in\text{-}n}$ |

Process variable(s): Manipulated variable(s) and Uncontrollable state variable(s)

GAS TURBINE CONTROL METHOD AND DEVICE

BACKGROUND OF THE INVENTION

1. Field of the Invention

The present invention relates to a control method and a control device as to a gas turbine. More concretely, the present invention relates to a gas turbine control method and a control device thereof for controlling the gas turbine so that the gas turbine is prevented from continuing an operation out of the regular operation line (condition), namely an operation line under an ideal fuel flow rate and air flow rate that are assumed at the design stage of the gas turbine, by adjusting operation control factors so as to restrain the combustion vibrations during the operation of the gas turbine.

2. Background of the Invention

For instance, in a gas turbine driving a generator (an AC generator), the air flow rate and the fuel flow rate toward the combustors of the gas turbine are determined based on the load (the power required by the generator), the ambient temperature, the ambient humidity and so on; and the air flow rate and the fuel flow rate at at-least-one point on the operation line such as a rated operation point are finely adjusted in the trial operation of the gas turbine so that the fine-adjusted air flow rate and fuel flow rate are used as the initial design data (or a protocol condition). However, the period of the trial operation is limited only within a predetermined certain time span; as a matter of course, the trial operations cannot be performed for all the weather conditions that the gas turbine is supposed to encounter. In addition, the actual air flow rate and the fuel flow rate of the gas turbine after being commissioned may deviate from those at the design stage or the trial operation stage due to the secular change such as the deterioration of the compressor performance or the clogging of filters.

On the other hand, the gas turbine is driven by the combustion gas produced through the continuous exothermic oxidation reaction between the fuel and the air supplied into the combustors; thereby, the combustion occasionally accompanies the combustion gas pressure fluctuations of a frequency from 10-Hz to several thousands-Hz, the combustion gas pressure fluctuations including:

the combustion noise caused by the turbulent flow combustion due to the exothermic oxidation reaction, and the combustion vibration caused by the interaction between the heat dissipation due to the time lag from fuel evaporation to fuel combustion as well as the flame propagation speed change due to combustion gas diffusion and revolution.

When particular attention is paid to the combustion vibrations, it is recognized that the above-described interaction (between the heat dissipation and the flame propagation speed change) is the vibration source; and, resonance sometimes occurs between the natural frequencies regarding the interaction and the natural frequencies regarding the combustor as an air-column; thus, the combustion vibrations having own frequencies in a peculiar frequency range grow in the combustor. Such combustion vibrations as described are basically unavoidable, whether the strength of the vibration is greater or smaller; and, the strength level depends on the volume of the combustor, the geometry of the combustor, the combustion performance in relation to the combustion gas temperature, and so on.

On the other hand, the demand for further compact and high-powered gas turbines becomes remarkable nowadays. Accordingly, the combustion becomes higher and higher. In order to cope with resulting increased thermal stresses due to the load fluctuations of the gas turbine as well as the rapid temperature increase in the combustor, the heat resisting steel of high strength is used for the combustor and the members therearound; at the same time, in order to reduce the time and manpower regarding delivery, installation, inspection and so on, the less thickness material for its strength is used. As a result, a possibility arises that cracks may be produced on the combustor; the support member may be seriously damaged; the life expectancy as to the configuration members of the gas turbine (or the combustor) may be reduced.

Since such combustion vibrations as described hinder the operation of the gas turbine to a great extent, the countermeasures to restrain or evade the combustion vibrations as far as possible are strongly required in view of plant protection and availability enhancement. Thus, it is essential that the skilled engineers take care of the control system of the gas turbine and confirm the operation stability several times a year so that the combustion stability is maintained and the combustion vibrations do not occur. This practice brings the increase of maintenance cost as well as the decrease of availability.

Against the above-described problems, the patent reference 1 (JP1997-269107), for instance, discloses a combustor combustion vibration control device and a method thereof for restraining the combustion vibrations caused by the pressure fluctuations in the combustor, whereby the device and the method comprising:

a frequency analyzing means that performs frequency analyses as to the pressure fluctuations of the combustion gas, a central processing unit (means) that computes the conditions (information data) to stabilize the combustion vibrations based on the frequency band in which the result of the pressure fluctuation frequency analyses exists, the pressure fluctuation frequency analyses being performed by the frequency analyzing means;

a voltage amplification means that amplifies the outputted signals (information data) outputted by the central processing unit (means);

a controlling means that transforms the amplified signals amplified by the voltage amplification means into the order signals to open/close the fuel valves, and transmits the order signals toward the fuel valves.

The combustion vibration control device and a method disclosed by the patent reference 1 treat with the combustion vibrations of a lower frequency. However, the frequencies of the combustion vibrations occurring in a gas turbine cover a range from a low frequency around 10-Hz to a high frequency of several thousands-Hz; moreover, a plurality of kinds of the combustion vibrations often occurs in a plurality of frequency bands at the same time. Accordingly, if the air fuel ratio as to the gas turbine operation is controlled based on the vibration countermeasure focusing on the low frequency band as per the approach disclosed by the patent reference 1 (JP1997-269107), then there is a possibility that the combustion vibration status in other frequency bands may become worse.

In the patent reference 2 (JP2005-155590), against the background of the above-described problem, the applicants of this specification proposed a gas turbine control device for effectively restraining the combustion vibrations of the gas turbine; in the proposed approach, an order of priority is predetermined, the order relating to which frequency band out of a plurality of frequency bands should be treated so as to restrain the combustion vibrations; in response to the predetermined priorities, the gas turbine operation is adjusted so that the combustion vibrations in a high priority frequency band is controlled; further, the control device is provided with a database that memorizes the information data as to the control adjustments relating to the fuel flow rate and/or the air flow rate supplied into the gas turbine as well as relating to the resulting combustion status changes (caused by the adjustments) in the combustor; moreover, the database is provided with a basic database that stores the information data obtained by the analyses on the basis of the data accumulated in the database; further, on the basis of the data stored in the basic database, at least one of the fuel flow rate and the air flow rate is adjusted (controlled) so that the combustion vibrations are effectively restrained (controlled) even in a case where the combustion vibrations occur in a plurality of frequency bands.

Summing up the main points as for the patent reference 1, the control device and the method thereof treat with the combustion vibrations of a lower frequency; therefore, if the air fuel ratio as to the gas turbine operation is controlled based on the vibration countermeasure focusing on the low frequency band, then there is a possibility that the combustion vibration status in other frequency bands may become worse.

On the other hand, according to the disclosure of the patent reference 2, the combustion vibrations relating to the high priority frequency bands can be effectively restrained; however, there is still a problem; namely, in this approach, the information data as to the control adjustments are stored in the database; similarly, the information data as to the combustion status changes caused by the adjustments are also stored in the database; based on the information data accumulated in the database, the control parameters (variables) are studied (analyzed) as shown in FIG. 12(A); on the basis of the studied data, the control (adjustment) is performed so that the combustion vibrations are restrained; thus, during the adjustments, the efficiency of the gas turbine, for example, is not taken into consideration; as shown in FIG. 12(B), the efficiency is reduced when the adjustments are performed (cf. the right side of FIG. 12(B), namely, the right side with regard to the arrow pointer); in addition, the lateral axis relates to the elapsed time, and the vertical axis relates to the efficiency in FIG. 12(B).

Summing up the main points as for the patent reference 2, the adjustments focus mainly on the vibration countermeasures; thereby, the deviations from the ideal operating point or the ideal operating line as to the initial design stage of the machine are disregarded; similarly, the fatigue life of the machine is also disregarded.

The explanation about FIGS. 12(A) and 12(B) is hereby added. In FIG. 12(A), the lateral axis denotes the load under which the gas turbine is put; the vertical axis denotes the opening of a valve that controls the fuel flow rate or the air flow rate; the points with marks ■ are the operation points before the adjustments are performed, and the points with marks ▲ are the operation points under stabilized conditions after the adjustments are performed; in a load range from around 90% to around 110% in FIG. 12(A), it can be seen that the valve opening after adjustments becomes greater than that before adjustments; further, in FIG. 12(B) where the lateral axis denotes the elapsed time and the vertical axis denotes the efficiency of the gas turbine, it can be seen that the efficiency falls down in the right side of FIG. 12(B), namely, the right side with regard to the arrow pointer. In other words, since the adjustments are performed so as to restrain the combustion vibrations without consideration regarding ideal operating conditions of the initial design stage, the efficiency drops after the adjustments. The adjustment approach as per the patent reference 2 makes the fuel flow rate valve opening or the airflow rate valve opening deviate from the ideal opening under the ideal initial (delivery or commissioning) condition.

Further, in the adjustment approach as per the patent reference 2, the view regarding the fatigue life of the gas turbine is not taken into consideration.

In view of the problems in the disclosed technologies, the present invention aims at providing a gas turbine control method and a device thereof whereby the gas turbine can be prevented from continuing the operation status which is deviated from the ideal operating points regarding the ideal fuel flow rate or the airflow rate, and the gas turbine can maintain the operation status in which the design performance and the gas turbine fatigue life are taken into consideration, the design performance and the gas turbine fatigue life being assumed in the design stage of the gas turbine. In the following paragraphs, the contents of the present invention are disclosed; thereby, the numerals with parentheses (3), (12), (13), and (14) are the component numbers that are later explained in connection with the attached drawings.

DISCLOSURE OF THE INVENTION

In order to solve the above problems, the present invention discloses a gas turbine control method, comprising:
    a first step of analyzing pressure fluctuations or accelerations as to combustors in the gas turbine, at each of a plurality of frequency bands over the whole combustion vibration frequency range of the gas turbine;
    a second step of grasping characteristics relating to the combustion vibrations in the gas turbine, at each of the frequency bands, on the basis of the analysis results obtained by the first step, as well as, on the basis of status signals including the information data
        regarding actuating variables comprising airflow rate and pilot ratio, namely the ratio of the pilot fuel flow rate to the total fuel flow rate in the gas turbine, as well as,
        regarding state variables comprising atmospheric condition variables and load index variables in the gas turbine;
    a third step of computing adjustment increments regarding at least one of the airflow rate into the combustor and the pilot ratio, and making revisions to the actuating variables comprising the airflow rate and the pilot ratio so that the actuating variables are contrasted with the status signals and the variables are modified against initial design conditions,
        every moment the level of the combustion vibration exceeds a predetermined control criterion,
    a fourth step of issuing orders as to the adjustment increments computed in the third step so as to operate the gas turbine, and judging whether or not the level of the combustion vibration is restrained below the predetermined control criterion for a predetermined time span;
    wherein, on the basis of the judgment result in the fourth step,
    the gas turbine is operated under the conditions that the revisions according to the third step are reset; and the gas turbine is operated under the control settings of the initial design stage.

Further, the present invention discloses a gas turbine control device, comprising:
    a frequency analyzing means (13) that analyzes pressure fluctuations or accelerations as to combustors in the gas turbine, at each of a plurality of frequency bands over the whole combustion vibration frequency range of the gas turbine;
    an operation status grasping means (12) that grasps combustion status in the gas turbine, on the basis of the analysis results obtained by the frequency analyzing means, as well as, on the basis of status signals including information data
regarding actuating variables comprising airflow rate and pilot ratio, namely the ratio of the pilot fuel flow rate to the total fuel flow rate in the gas turbine, as well as,
regarding state variables comprising atmospheric condition variables and load index variables in the gas turbine;
a combustion characteristic grasping means (14) that grasps characteristics relating to the combustion vibrations in the gas turbine, on the basis of the analysis results obtained by the frequency analyzing means, as well as, on the basis of the status signals including the information data
regarding the actuating variables comprising the airflow rate and the pilot ratio in the gas turbine, as well as,
regarding the state variables comprising the atmospheric condition variables and the load index variables in the gas turbine;
a gas turbine control unit (3) for the gas turbine operation control that
computes adjustment increments regarding at least one of the airflow rate into the combustor and the pilot ratio, and
makes revisions to the actuating variables comprising the airflow rate and the pilot ratio so that the actuating variables are contrasted with the status signals, and the variables are modified against (toward) initial design conditions,
every moment the level of the combustion vibration exceeds a predetermined control criterion,
on the basis of the combustion vibration characteristics grasped by the combustion characteristic grasping means (14) and the combustion status grasped by the operation status grasping means (12);
wherein,
the gas turbine control unit (3) resets (cancels) the revisions made to the actuating variables in a case where the level of the combustion vibration is restrained below the predetermined control criterion for a predetermined time span, and the gas turbine is operated under the control settings of the initial design stage.
Moreover, the present invention discloses a gas turbine control method, comprising:
a first step of analyzing pressure fluctuations or accelerations as to combustors in the gas turbine, at each of a plurality of frequency bands over the whole combustion vibration frequency range of the gas turbine;
a second step of grasping characteristics relating to the combustion vibrations in the gas turbine, at each of the frequency bands, on the basis of the analysis results obtained by the first step, as well as, on the basis of status signals including the information data
regarding actuating variables comprising airflow rate and pilot ratio, namely the ratio of the pilot fuel flow rate to the total fuel flow rate in the gas turbine, as well as,
regarding state variables comprising atmospheric condition variables and load index variables in the gas turbine;
a third step of computing adjustment increments regarding at least one of the airflow rate into the combustor and the pilot ratio, and making revisions to the actuating variables comprising the airflow rate and the pilot ratio so that the actuating variables are contrasted with the status signals and the variables are modified against initial design conditions,
every moment the level of the combustion vibration exceeds a predetermined control criterion;
a fourth step of issuing orders as to the adjustment increments computed in the third step so as to operate the gas turbine, and judging whether or not the level of the combustion vibration is restrained below the predetermined control criterion for a predetermined time span;
wherein, on the basis of the judgment result in the fourth step,
the gas turbine is operated under the condition variable settings according to the third step return back to initial design settings step by step.
Moreover, the present invention discloses a gas turbine control device, comprising:
a frequency analyzing means (13) that analyzes pressure fluctuations or accelerations as to combustors in the gas turbine, at each of a plurality of frequency bands over the whole combustion vibration frequency range of the gas turbine;
an operation status grasping means (12) that grasps combustion status in the gas turbine, on the basis of the analysis results obtained by the frequency analyzing means, as well as, on the basis of status signals including information data
regarding actuating variables comprising airflow rate and pilot ratio, namely the ratio of the pilot fuel flow rate to the total fuel flow rate in the gas turbine, as well as,
regarding state variables comprising atmospheric condition variables and load index variables in the gas turbine;
a combustion characteristic grasping means (14) that grasps characteristics relating to the combustion vibrations in the gas turbine, on the basis of the analysis results obtained by the frequency analyzing means, as well as, on the basis of the status signals including the information data
regarding the actuating variables comprising the airflow rate and the pilot ratio in the gas turbine, as well as,
regarding the state variables comprising the atmospheric condition variables and the load index variables in the gas turbine;
a gas turbine control unit (3) for the gas turbine operation control that
computes adjustment increments regarding at least one of the airflow rate into the combustor and the pilot ratio, and
makes revisions to the actuating variables comprising the airflow rate and the pilot ratio so that the actuating variables are contrasted with the status signals, and the variables are modified against (toward) initial design conditions,
every moment the level of the combustion vibration exceeds a predetermined control criterion,
on the basis of the combustion vibration characteristics grasped by the combustion characteristic grasping means (14) and the combustion status grasped by the operation status grasping means (12);
wherein,
the gas turbine control unit (3) makes revisions to the actuating variables so that the gas turbine is operated under a condition that control setting revisions return back to variable settings closer to initial design settings step by step, in a case where the level of the combustion vibration is restrained below the predetermined control criterion for a predetermined time span.

In the control system according to the above-described methods and devices, the airflow rate and the pilot ratio as the process variables or process signals (corresponding to actuating variables of the initial design stage) are adjusted in order to control the combustion vibrations when the vibrations occur in the gas turbine; the gas turbine continues being operated with the adjusted process variables or signals till the combustion vibrations are restrained below the predetermined control criterion for a predetermined time span; then, the adjustment revisions made to the process variables or signals are reset (canceled) or the adjustably revised process variables get closer to the initial design settings step by step. Thus a gas turbine control method and device can be realized whereby the gas turbine is prevented from continuing an operation conditions deviating from the initial design conditions; the gas turbine is operated in consideration of the machine fatigue life.

Preferable embodiments regarding the above-described control devices and methods are hereby referred to. The preferable method is the gas turbine control method, wherein the gas turbine is operated under the condition the variable settings (adjustably revised process variables) according to the third step return back to the initial design settings step by step, whereas the level of the combustion vibration is restrained below a stricter criterion that is stricter initially predetermined criterion, the stricter criterion being formed with a plurality of stricter thresholds that are smaller than the initially predetermined thresholds, for the frequency bands.

The preferable device is the gas turbine control device wherein, the gas turbine control unit (3) makes revisions to the actuating variables so that the gas turbine is operated under a condition that the control setting revisions (adjustably revised process variables) approach the variable settings closer to the initial design settings step by step, whereas the level of the combustion vibration is restrained below a stricter criterion that is stricter initially predetermined criterion, the stricter criterion being formed with a plurality of stricter thresholds that are smaller than the initially predetermined thresholds, for the frequency bands.

As described thus far, the gas turbine control method and device for evading combustion vibrations once perform desirable adjustments as to the control system's settings when the combustion vibrations occur; when the operation is stable while the gas turbine is watched for a predetermined time span, the control system's settings during operation are returned back to the initial settings of the system, or the control system's settings are changed so as to take the fatigue life of the gas turbine into consideration; thus, the control method and device is provided with the functions as described above; therefore, the adjustments as to the control system of the gas turbine can be performed so that the combustion stability is achieved in a case where the unstable combustion occurs due to the temporary unstable phenomena attributable to the thermal load or capacity of the gas turbine; further, the adjustments as to the control system of the gas turbine can be performed so that the control settings during operation are returned back to the initial settings of the system, or the control system's settings during operation are changed so as to take the fatigue life of the gas turbine into consideration.

In this way, the gas turbine control device is provided with a function for operating the gas turbine under the control system settings as per the intention of the customers and the manufacture, except for special operation conditions (or optional requirements).

BRIEF DESCRIPTION OF THE DRAWINGS

FIG. 7 shows a configuration example as to a database used in the present invention;

DETAILED DESCRIPTION OF THE PREFERRED EMBODIMENTS

Hereafter, the present invention will be described in detail with reference to the preferred embodiments shown in the figures. However, the dimensions, materials, shape, the relative placement and so on of a component described in these embodiments shall not be construed as limiting the scope of the invention thereto, unless especially specific mention is made.

First Embodiment

Figure 10:
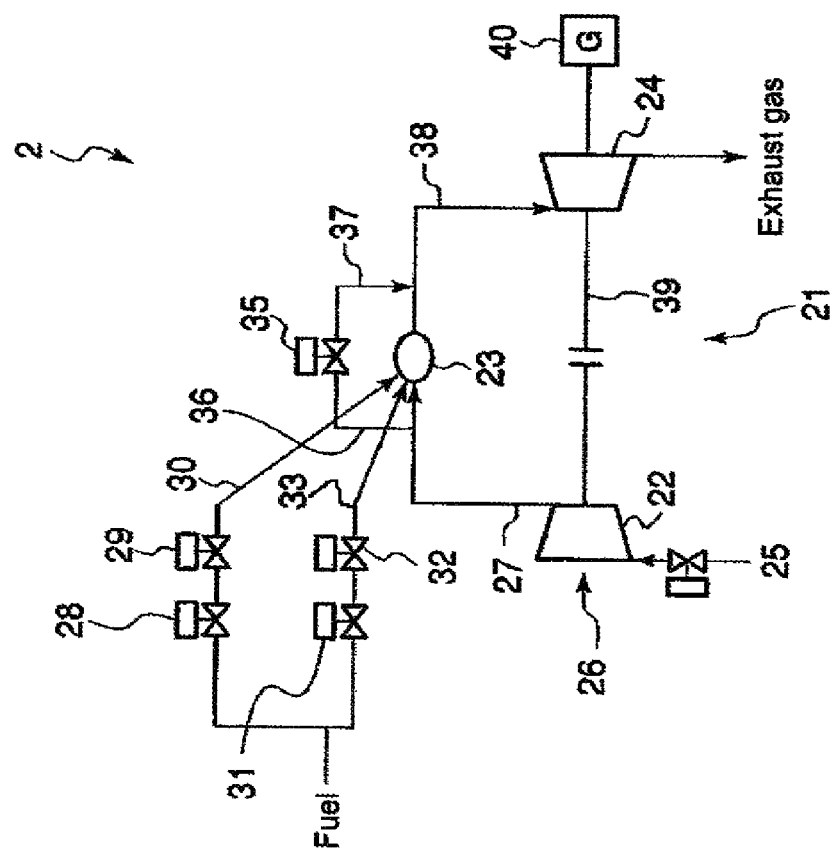
FIG. 10 shows an outline drawing for explaining a gas turbine configuration.
Figure 11:
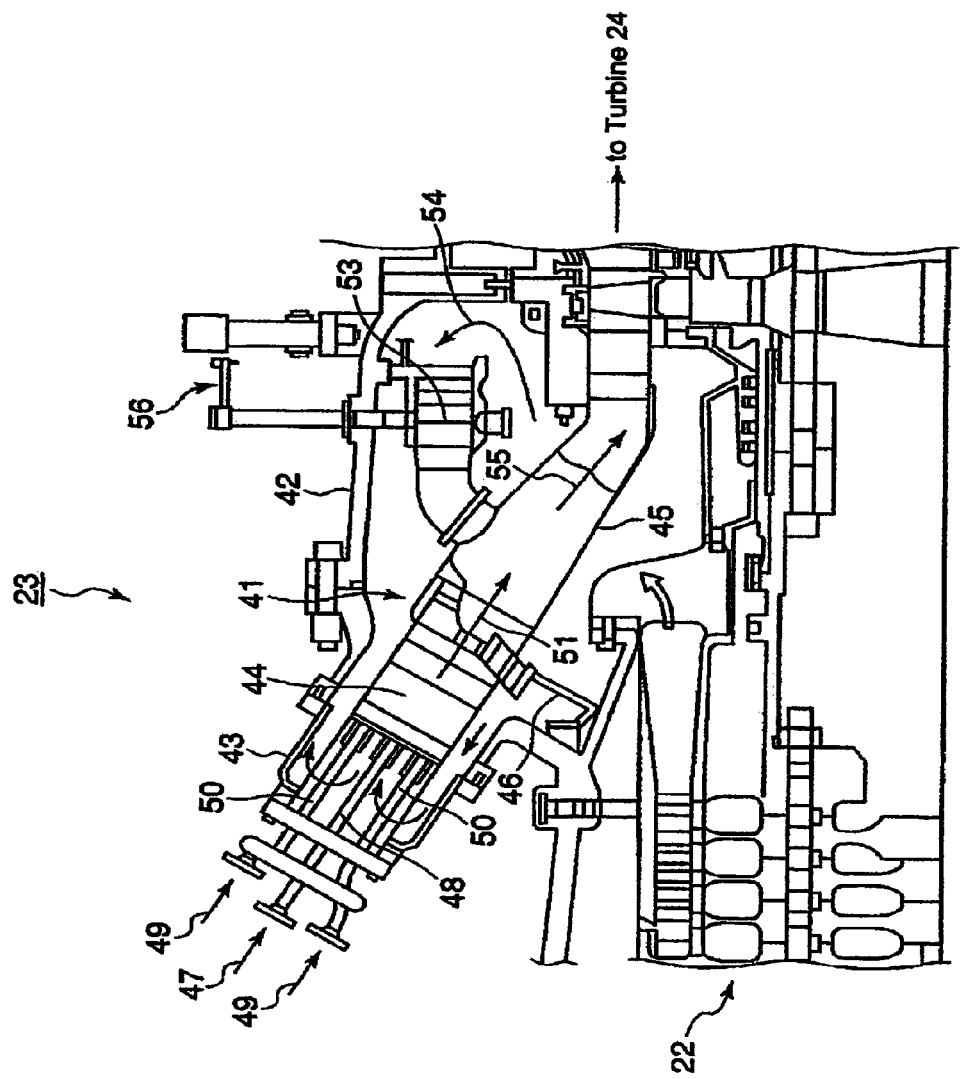
FIG. 11 shows a cross-section of a combustor of the gas turbine, the cross section showing an outline configuration as to the combustor.
Figure 12:
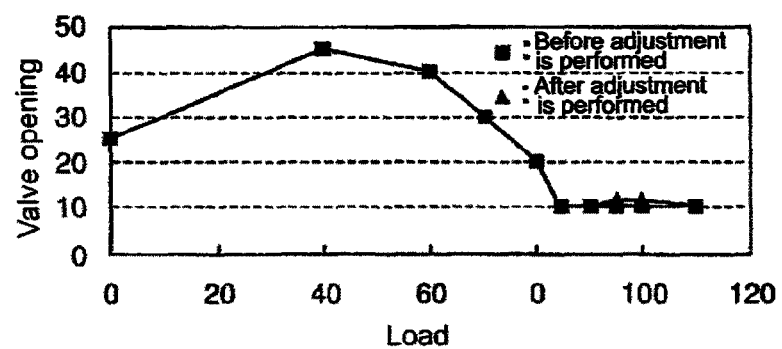
FIG. 12(A) shows a relation between the (main fuel?) valve opening and the load, in a case where the combustion vibration is restrained based on the information obtained through the frequency analysis.
FIG. 12(B) shows an example as to an efficiency drop in a case where a turning is performed so that the combustion vibration is restrained (according to the conventional approach).
Figure 12:
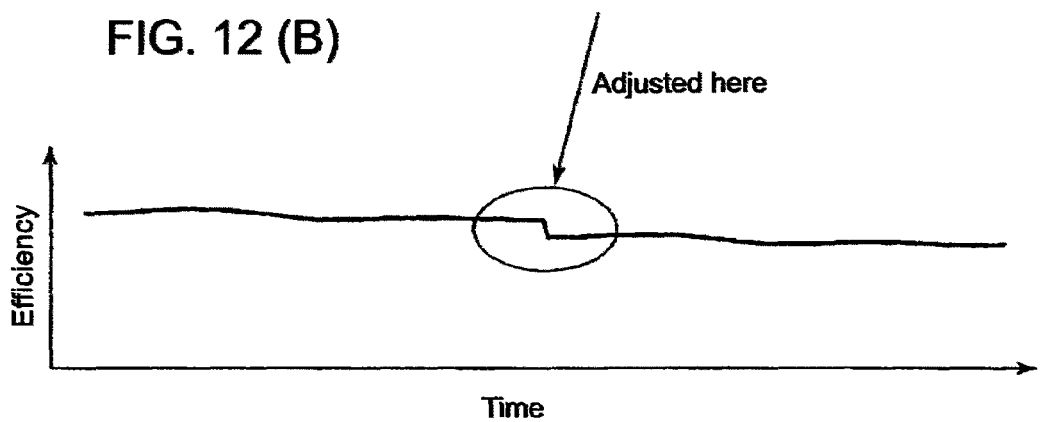

In the first place, a gas turbine 2 is briefly explained in relation to FIG. 10 that shows the configuration of the gas turbine 2 as well as FIG. 11 that shows the outline cross section as to the configuration of the combustor 23 of the gas turbine 2. At first, as shown in the outline cross-section of FIG. 10, the gas turbine comprises: a compressor 22 having a plurality of inlet guide vanes 26; a gas-turbine body 21 having a turbine 24 connected to the compressor 22 and a generator 40, via a rotating shaft 39, thereby a combustor 23 supplies the combustion gas to the turbine 24 through a combustion gas introduction tube 38, and the combustion gas is discharged outside through a piping system.

The rotational movement of the turbine 24 is transferred to the rotational movement of the compressor 22 through the a rotating shaft 39; the compressor inhales the ambient air 25 through an air suction port that is fitted at the compressor and provided with a filter; the compressor generates compressed air, and supplies the compressed air to the combustor 23 through a compressed air introduction part 27; the compressed air is used for the combustion in the combustor. Further, the flow rate of the air supplied to the compressor 22 can be controlled by adjusting the attack angle of a plurality of inlet guide vanes 26 provided in the compressor 22, when even the revolution speed of the compressor is constant.

The combustor 23 communicates with the compressed air introduction part 27, a bypass air introduction (entrance) tube 36, a bypass valve 35, and a bypass air mixer tube 37; thereby, the compressed air introduction part 27 is a space through which the (compressed) air discharged from the compressor is guided to the bypass air introduction (entrance) tube 36 connected to the combustor 23 or the inside of a body casing of the combustor 23; thus, the compressed air introduction part 27 guides the air discharged from the outlet of the compressor toward the combustor 23. An end of the bypass air introduction (entrance) tube 36 is connected to the compressed air introduction part 27 without a throttle, a choke or, a kind of valve or the like at the connection point. Another end of the bypass air introduction (entrance) tube 36 is connected to the bypass valve 35 that controls the flow rate of the air passing through the bypass air introduction (entrance) tube 36; a part of the (compressed) air discharged from the compressor bypasses the combustor 23 and flows toward the turbine 24. In addition, the bypass air mixer tube 37 is connected to the other side (different from the connection side between the bypass valve 35 and the bypass air introduction (entrance) tube 36) of the bypass valve; and, the bypass air mixer tube 37 communicates with a combustion gas introduction tube 38 so that the air passing through the bypass valve 35 is sent into the combustion gas introduction tube 38 and mixed with the combustion gas formed in the combustor 23.

On the other hand, main fuel 49 is supplied to the combustor 23 through at least one main fuel (flow rate) control valve 28 and at least one main fuel supply valve 29; further, pilot fuel 33 is supplied to the combustor 23 through at least one pilot fuel (flow rate) control valve 31 and at least one pilot fuel supply valve 32. An end (a fuel inlet side end) of the main fuel (flow rate) control valve 28 is connected to a pipe that feeds fuel toward the gas turbine from an outside fuel source; another end (a fuel delivery side end) of the main fuel (flow rate) control valve 28 is connected to a pipe that communicates with the main fuel supply valve 29; the main fuel (flow rate) control valve 28 controls the flow rate of the fuel from the outside fuel source toward the combustor 23, while the main fuel supply valve 29 controls the fuel flow toward a main burner of the combustor 23.

An end (a fuel inlet side end) of the pilot fuel (flow rate) control valve 31 is connected to a pipe that feeds fuel toward the gas turbine from an outside fuel source; another end (a fuel delivery side end) of the pilot fuel (flow rate) control valve 31 is connected to a pipe that communicates with the pilot fuel supply valve 32; the pilot fuel (flow rate) control valve 31 controls the flow rate of the fuel from the outside fuel source toward the combustor 23, while the pilot fuel supply valve 32 controls the fuel flow toward a pilot burner. The main fuel 49 is burnt so as to form main (major) flames, while the pilot fuel 33 is burnt so as to form pilot flames that stabilizes the combustion as to the main flames.

In the next place, in FIG. 11 where the outline cross-section as to the gas turbine combustor 23 is shown, the combustor 23 of the gas turbine comprises the compressor 22, a combustor body 41, a combustor casing 42, an outer casing 43, an inner tube 44 and a tail pipe 45. The outer casing 43 joins the combustor casing 42; the combustor body 41 is housed between combustor casing 42 and the outer casing 43. The combustor body 41 is placed at a predetermined position of combustor casing 42 by means of a support 46; further, the combustor body 41 is provided with a pilot fuel nozzle 48 to which the pilot fuel is supplied, and a main fuel nozzle 50 to which the main fuel is supplied; and, the air discharged from the compressor 22 into the combustor casing 42 is supplied to the combustor body 41 through the space between the combustor casing 42 and the inner tube 44.

The pilot fuel nozzle 48 injects the pilot fuel 47 toward an area (not shown) where the compressed air from the compressed air introduction part 27 exists, so that diffusion combustion is performed and pilot flames, namely, diffusion flames are formed. The main fuel nozzle 50 injects the main fuel 49 toward a premixing device, namely, a fuel-air premixing device (not shown) where a fuel-air mixture made from the compressed air supplied through the compressed air introduction part 27 and the main fuel supplied through the main fuel nozzle is formed; the formed fuel-air mixture is supplied into the inner tube 44 so that the pilot flames initiates flame propagation through the fuel-air mixture; thus, the main fuel is burnt in the inner tube 44 so as to for the main flames. The main flames (namely, by the main fuel combustion) produce a high temperature combustion gas 51. Thereby, the combustion gas 51 is guided into the tail pipe 45 through the inner tube 44.

The bypass valve 53 joins the tail pipe 45 via a bypass elbow 52; the bypass valve 53 is provided with an opening (a mouth) toward the space inside the combustor casing 42; a part of the air flowing into the combustor is taken out as the bypass air 54, which is supplied inside of the tail pipe through the opening. Inside of the tail pipe 45, the combustion gas 51 and the bypass air 54 are mixed so as to form a combustion gas 55 and supply the gas 55 to the turbine 24. The flow rate of the bypass air 54 that is mixed with the combustion gas 51 is adjusted based on the opening (degree of opening) of the bypass valve 53 that is operated with a variable opening mechanism 56 so that the opening corresponds to the demand power which the generator 40 requires to the gas turbine 2.

In the gas turbine 2 of the configuration as described above, the compressor 22 compresses the suction air inhaled from the outside; and, the compressed air is supplied to each combustor 23 (there are a plurality of combustors in a gas turbine, as a matter of course). On the other hand, a part of the fuel inputted into the gas turbine reaches the pilot fuel supply valve 32 of each combustor 23 via the pilot fuel (flow rate) control valve 31; then, the fuel is guided into the (concerned) combustor 23. The rest of the whole fuel reaches the main fuel supply valve 29 of each combustor 23 via the main fuel (flow rate) control valve 28; then, the fuel is guided into the (concerned) combustor 23. The guided air and fuel burn in the combustor 23, generating the combustion gas that is guided into the turbine 24 and rotates the turbine 24; the generator 40 transforms the rotational energy of the turbine into electric power.

Figure 1:
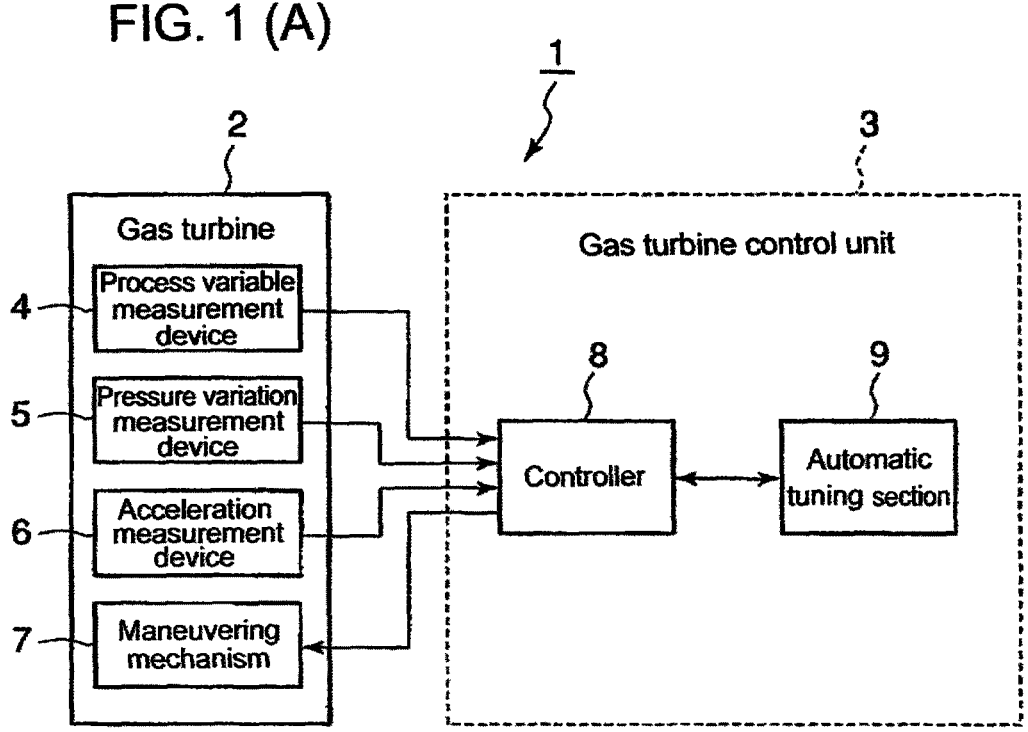
FIG. 1(A) is a block diagram that depicts the functional configuration for controlling a gas turbine 2.
FIG. 1(B) is a detailed block diagram as to an automatic tuning section 9 in a gas turbine controller 3 as depicted in FIG. 1(A)
Figure 1:
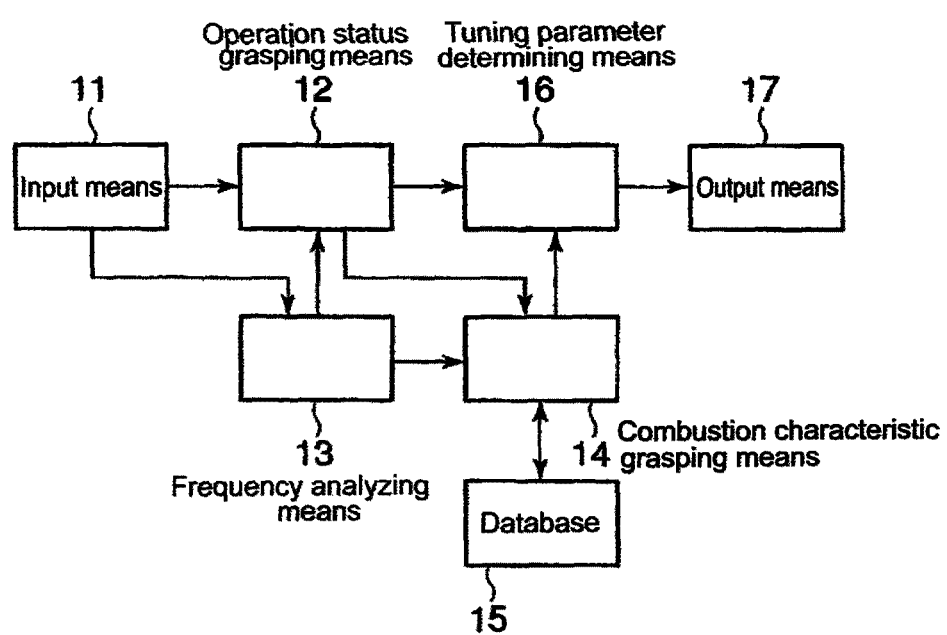

Hereby, a control device for the gas turbine 2 as described thus far is now explained in consultation with FIGS. 1(A) and 1(B). FIG. 1(A) is a block diagram that depicts the functional configuration for controlling a gas turbine 2; FIG. 1(B) is a detailed block diagram as to an automatic tuning section 9 in a gas turbine controller 3 (a gas turbine control device) as depicted FIG. 1(A). As shown in FIG. 1(A), in order that the gas turbine controller 3 controls the gas turbine 2, the gas turbine is provided with a process variable measurement device 4, a pressure variation measurement device 5, an acceleration measurement device 6, and a maneuvering mechanism (an operating system) 7. The hereby-described components (devices) of the gas turbine 2 are explained as follows.

The process variable measurement device 4 comprises a plurality of measuring instruments for measuring a plurality of process variables that indicate the operation conditions or operating status during the operation of the gas turbine 2; and, each of the instruments are arranged at a pertinent component (or a part) of the gas turbine. The measured result regarding each instrument is outputted to a controller 8 in the gas turbine controller 3 (the gas turbine control device) at each time point of a series of the predetermined time points t1, t2, . . . . Hereby, the process variables are, for instance, generating power (current or voltage), ambient temperature, ambient humidity, fuel flow rates and fuel pressures at various points in the fuel supply system, air flow rates and air pressures at various points in the air system, combustion gas temperature at the combustor 23, combustion gas flow rates, combustion gas pressure, rotating speeds of the compressor 22 or the turbine 24, emission component concentrations, notably nitrogen oxide (NOx) or carbon monoxide (CO) in the exhaust gas emitted from the turbine 24, and so on. In addition, these process variables are classified into two groups: "manipulated variables (controllable plant data or variables)" that can be handled, for example, fuel amount or air amount supplied to the gas turbine 2; "uncontrollable state variables" that cannot be manipulated, for example, weather data such as ambient temperature, or generator power output (e.g. MW output) determined by the load required from the outside system.

The pressure variation measurement device 5 is a pressure sensor that is fitted to each one of the multiple combustors 23; and, the device 5 outputs the data as to the pressure variations that occur due to the combustion in each combustor 23, into the gas turbine controller 3, at each time point of a series of the predetermined time points t1, t2, . . . , according to the order issued by the controller 8. The acceleration measurement device 6 that is fitted to each one of the multiple combustors 23 is an accelerometer; and, the device 6 outputs the data as to the vibration accelerations (the second degree differentiation of position coordinate with respect to time) that are caused by the combustion in each combustor 23, into the gas turbine controller 3, at each time point of a series of the predetermined time points t1, t2, . . . , according to the order issued by the controller 8.

The maneuvering mechanism 7 is an operating device (system) that manipulates the variables such as the openings as to the main fuel (flow rate) control valve 28 and the main fuel supply valves 29, the openings as to the pilot fuel (flow rate) control valve 31 and the pilot fuel supply valves 32, the opening as to the bypass valve 35, and the (rotary) vane angle as to the inlet guide vane 26 for the compressor 22. Thus, the maneuvering mechanism 7 controls the variables such as the main fuel flow rate, the pilot fuel flow rate, the flow rate of the air supplied to each combustor 23, and the flow rate of the air guided into the compressor 22. In addition, the flow rate of the air supplied to each combustor 23 is more concretely performed by controlling the flow rate of the air supplied to each combustor 23, so that the opening of the bypass valve 35 is increased (or decreased) and the air flow rate through the bypass valve is increased (or decreased).

The gas turbine controller (the gas turbine control device) 3 is provided with the controller 8 and the automatic tuning section (a search control section) 9. The controller 8 retrieves the measured data outputted from the process variable measurement device 4, the pressure variation measurement device 5, and the acceleration measurement device 6; and, the controller forwards the retrieved data to the automatic tuning section 9. Further, based on the order issued by the automatic tuning section 9, the controller 8 outputs the signals that the maneuvering mechanism 7 uses for manipulating the main fuel (flow rate) control valve 28, the main fuel supply valve 29, the pilot fuel (flow rate) control valve 31, the pilot fuel supply valve 32, the bypass valve 35, and the inlet guide vane 26.

FIG. 1(B) is a detailed block diagram as to the automatic tuning section 9 in the gas turbine controller 3 as depicted in FIG. 1(A); the numerals 11,12,13,14,15,16, and 17 denote an input means, an operation status grasping means, a frequency analyzing means, a combustion characteristic grasping means, a database, a tuning parameter determining means, and an output means respectively. The automatic tuning section 9 thus configured controls the manipulated variables (controllable plant variables) or the process variables so as to correct these variables toward the most effective correction paths (directions) and correction amounts, against the generated combustion vibrations. Further explanations will be given in the following paragraphs.

By the function of the input means 11, the automatic tuning section 9 receives the data such as the process variables, pressures, and accelerations the data which is forwarded by the controller 8 from the process variable measurement device 4, the pressure variation measurement device 5, and the acceleration measurement device 6 respectively; in addition, by use of the vibration frequency analysis results performed by the frequency analyzing means 13 the analysis results which relates to the combustion vibrations in the gas turbine 2, the operation status grasping means 12 of the automatic tuning section 9 grasps the operation status (as to combustion) of the gas turbine 2 as well as the combustion characteristic grasping means 14 of the automatic tuning section 9 grasps the combustion characteristics (combustion vibration characteristics) of each combustor 23. Based on the grasped data grasped by the operation status grasping means 12 and the combustion characteristic grasping means 14, the tuning parameter determining means 16 of the automatic tuning section 9 decides (establishes) a measures to evade potential combustion vibration in the gas turbine 2; thereby, the measure includes a decision about whether or not the gas turbine components such as the main fuel (flow rate) control valve 28, the main fuel supply valve 29, the pilot fuel (flow rate) control valve 31, the pilot fuel supply valve 32, the bypass valve 35, and the inlet guide vane 26 are adjusted (fine-tuned), as well as, what adjustments should be taken into consideration (what components should be adjusted) and how far or which direction the adjustments extend in a case where any adjustment as to the controllable variables should be performed. The above-described decision result of the tuning parameter determining means 16 of the automatic tuning section 9 is outputted into the controller 8, by the output means 17.

As further described later, the tuning parameter determining means 16 performs the preferable adjustments as to the control parameters (the controllable variables) so as to restrain the combustion vibrations in a case where the combustion vibrations occur; yet, the tuning parameter determining means 16 also has a function for restoring the original settings as to the control parameters in a case where the generated combustion vibrations are restrained into a normal condition, after a predetermined monitoring time span; or, the tuning parameter determining means 16 has a function for reducing the levels of the control parameter adjustments in a case where the generated combustion vibrations are restrained into a normal condition, after a predetermined monitoring time span. Thus, the tuning parameter determining means 16 performs the adjustments of the control parameters during temporary unstable combustion phenomena caused, for instance, by a transient response condition thereby the rated heat capacity of the gas turbine is occasionally prone to be insufficient; and, the unstable condition is eliminated. Further, when the unstable phenomenon disappears, the tuning parameter determining means 16 restores the original settings as to the control system, or reduces the levels of the adjustments as to the control variables. In this way, the gas turbine control device is provided with a function for operating the gas turbine under the control system settings as per the intention of the customers and the manufacture, except for special operation conditions.

Figure 2:
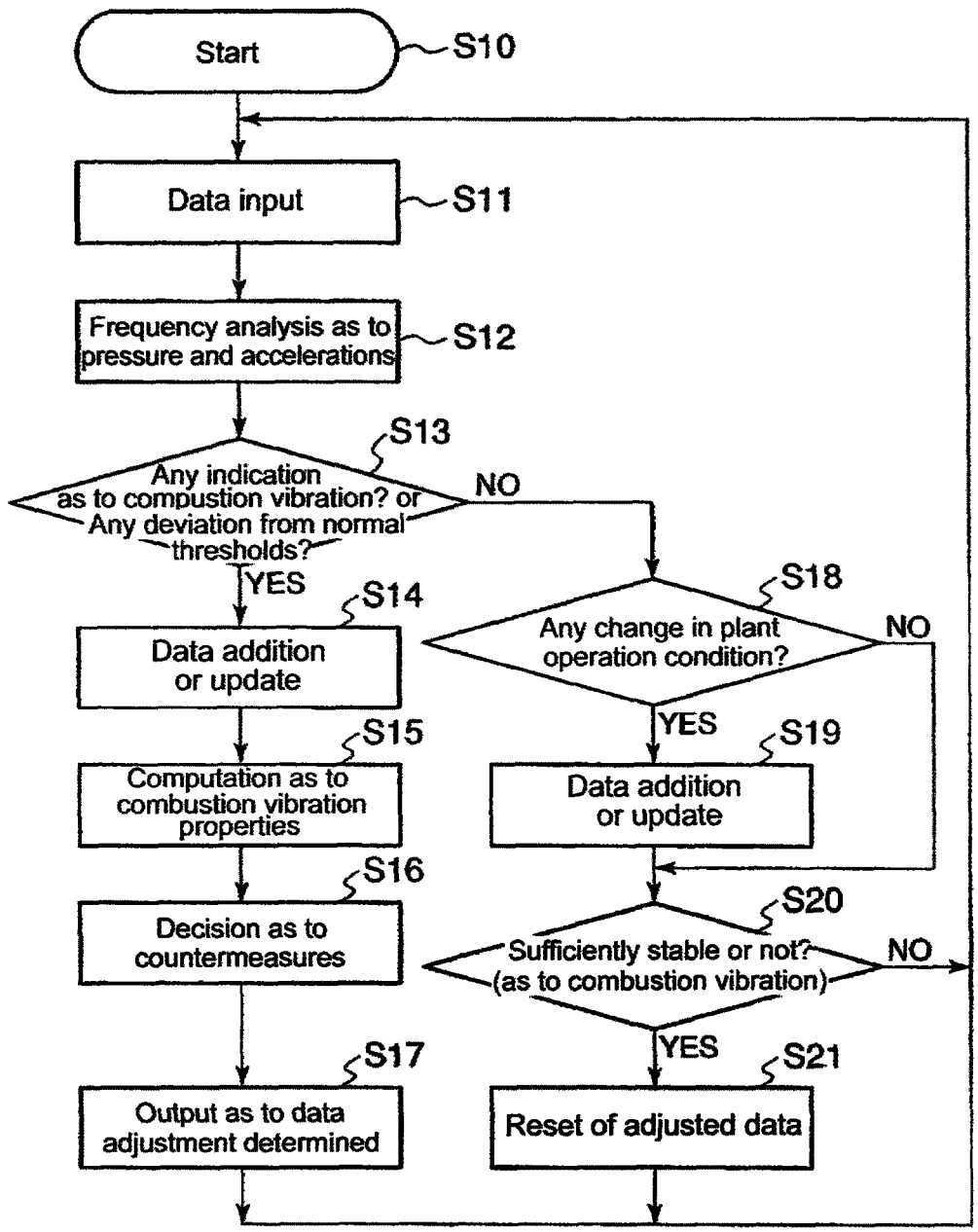
FIG. 2 shows a flow diagram as to a gas turbine control method of a first embodiment according to the present invention.

FIG. 2 shows a flow diagram as to the gas turbine control method according to the present invention; the flow diagram is incorporated into a part of the computer-based program that operates the gas turbine 2; the program executes a series of processes every predetermined interval of time while the gas turbine is operated.

When the step S11 following the step S10 (a starting step) in FIG. 2 is started, the input means 11 receives the data as to the process variables, the pressures and the accelerations, from the process variable measurement device 4, the pressure variation measurement device 5 and the acceleration measurement device 6, via the controller 8; and, the input means 11 sends the received data to the operation status grasping means 12 and the frequency analyzing means 13.

The operation status grasping means 12 grasps the properties of the fuel supplied to the gas turbine 2; the operation status grasping means 12 also investigates the presence or absence of the abnormalities (or the deviations from the regular conditions) about the operating conditions of the gas turbine 2. The reason why the diagnosis items include the fuel properties is that the fuel properties may change with time; for instance, in the fuel stored in a tank (not shown), the heavier constituent molecules go down in the tank as time goes by, while the lighter molecules are lifted up; as a result, the properties (e.g. calorific value) of the fuel supplied to the gas turbine 2 vary in response to the change of the fuel level in the tank. Thus, the process variable measurement device 4 (of the present invention) is provided with a calorific heat estimation device (a calorific heat meter) and a fuel component analyzer on the fuel system between the fuel tank and the gas turbine 2. The operation status grasping means 12 determines the adjustment values regarding the increase or decrease of the air-fuel ratio, based on the obtained data as to the fuel calorific values and the fuel components.

In addition, the calorific heat estimation and the fuel component analysis as described above are performed in real time; however, the data acquisition may be performed in non-real time. In other words, a table or a chart for determining the adjustment values may be prepared in advance; thereby, the table or the chart may reflect the relation between the fuel level in the tank and the fuel component change, the relation being grasped by measurements in advance. Thus, the process variable measurement device 4 also measures the fuel level in the tank, and the adjustment values based on the measurement data are used in increasing or decreasing the fuel-air ratio. Even in a case where the fuel is not supplied from a fuel tank but an outside piping system, the real time measurement approach or the non-real time measurement approach can be similarly used.

The diagnosis of whether the presence or absence regarding abnormalities in the gas turbine 2 is performed based on the data acquired by the process variable measurement device 4; namely, whether or not the gas turbine 2 is operated in a regular operating condition is judged based on the data. For instance, it is judged that the operating state of the gas turbine 2 is in disorder, if the temperature of some particular part or location in the gas turbine 2 reaches or exceeds (or falls below) a predetermined threshold; and, the operation status grasping means 12 informs an operator or a group in charge of the gas turbine operation that the machine is in disorder, by an annunciator means such as an alarm or a warning lamp.

Figure 5:
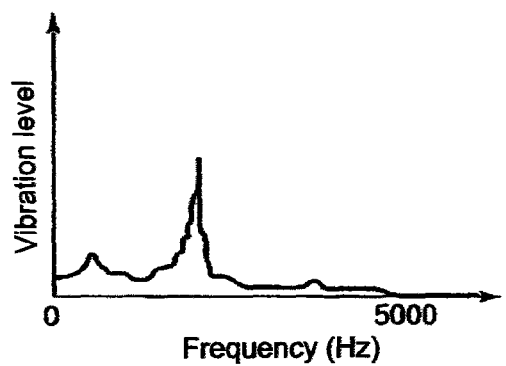
FIG. 5 is a graph showing an example as to an analyzing result according to a frequency analyzing means of the present invention.

When no abnormality is recognized, the frequency analyzing means 13 performs frequency analyses of the pressure variations or the acceleration in the step 12 that follows the step 11 in FIG. 2; further, the frequency analyzing means 13 makes a diagnosis of the pressure sensors and the acceleration sensors; namely, based on the pressure variations (i.e. vibrations) measured at each combustor 23, by the pressure variation measurement device 5, the frequency analyzing means 13 performs frequency analyses (e.g. FFT analysis) as to the variations. FIG. 5 is an example of the result as to the frequency analyses performed by the frequency analyzing means 13, based on the measured data according to the pressure variation measurement device 5. In FIG. 5, the lateral axis relates to frequency, while the vertical axis shows vibration strength (vibration level). In addition, the frequency analyzing means 13 can performs the frequency analyses as to the measured acceleration data according to the acceleration measurement device 6.

As shown in FIG. 5, the combustion vibration (pressure vibration or acceleration variation) in the combustor 23 comprises a plurality of vibration frequency components; each of the frequency components is derived from complicated factors (or complex factors); namely, the vibration in response to each frequency cannot be uniformly restrained by adjusting only one controllable variable (parameter). Further, the vibration effect on the gas turbine 2 differs from a frequency to a frequency; even if the vibration strength of a frequency is the same as that of another frequency, the (damaging) effect is different between the frequencies. Even if a vibration of a certain level (a vibration amplitude or speed level) is allowable at a certain frequency, another vibration of the same level at another frequency may have a fatal effect on the gas turbine. In this view of consideration, the operation control of the gas turbine 2 needs to be performed by at least two parameters (controllable variables), in regard to the concerned vibration frequency.

Figure 6:
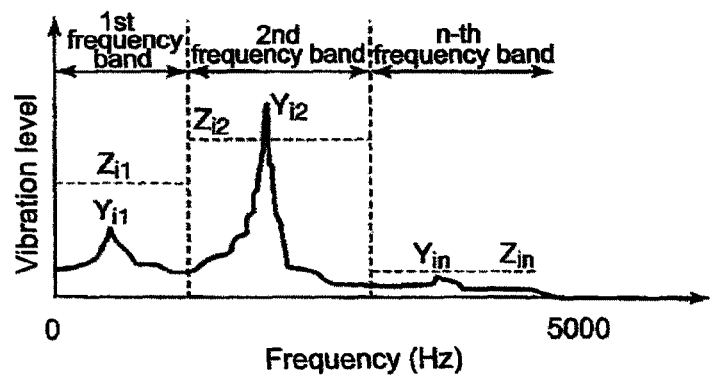
FIG. 6 is a graph showing an example as to an analyzing result by use of the frequency analyzing means of the present invention, the result being analyzed in each of a plurality of frequency bands.

Thus, as shown in FIG. 6, the frequency analysis result as to pressure fluctuations or the accelerations is outputted in multiple frequency bands (n frequency bands). The band is a minimal frequency range unit in which the analysis result according to the frequency analyzing means 13 is summarized (or expressed). For instance, the vibration treated in FIG. 5 has vibration components of the frequencies from 0 Hz to 5 kHz; thereby, the range 0 Hz to 5 kHz is divided into small ranges of an appropriate number n. If a small range (bands) is taken every 50 Hz width, the number n becomes 100; in addition, the bandwidth needs not to be of a constant size. In the way as described above, the frequency analyzing means 13 outputs the frequency analysis result obtained regarding the pressures or the acceleration per each divided band into the frequency analyzing means 12.

Further, the frequency analyzing means 13 makes a diagnosis of whether the presence or absence regarding abnormalities of: the pressure sensors or the acceleration sensors as to the pressure variation measurement device 5 or the acceleration measurement device 6; the data transfer system in which the data outputted by the pressure sensors and the acceleration sensors are inputted into the input means 11. This diagnosis function is provided, as the normal control becomes difficult in a case where there is an abnormality in relation to the pressure sensors, the acceleration sensors and the data transfer system. For instance, if the to-be-analyzed data include the noises due to the power source frequency component (e.g. 60 Hz noise component), the random noises over all the frequency bands, or the noise of a rectangular pulse as a direct current component of less than several tens of Hertz, then the frequency analysis result curve as depicted in FIG. 5 deviates from the proper curve, being raised upward entirely over the frequency bands. On the contrary, if the sensing function as to the pressure sensors and the acceleration sensors is deteriorated, then the frequency analysis result curve as depicted in FIG. 5 deviates downward from the proper curve, entirely over the frequency bands. Thus, the frequency analyzing means 13 judges whether or not the measured vibration levels are in a predetermined range; if not, it is estimated that the pressure sensors, the acceleration sensors or the data transfer system is out of order. In addition, the disorder as to the data transfer system can be easily recognized by setting a threshold as to the above described upward or downward shifting in contrast to the vibration frequency analysis result obtained by the frequency analyzing means 13 as depicted in FIG. 5.

Further, the frequency analyzing means 13 may be provided with a plurality of pressure sensors and acceleration sensors; and by comparing the measured data among the pressure sensors and the acceleration sensor, it may be judged whether or not an abnormality occurs regarding the pressure sensors, the acceleration sensor, or the data transfer system from the pressure sensors or the acceleration sensor to the input means 11. Further, since the acceleration measurement device 6 detects the vibrations of each combustor 23 by measuring the accelerations of the combustor, the acceleration measurement device 6 may monitor the vibrations of multiple combustors 23; thereby, even if the sensor of the pressure variation measurement device 5 provided at a combustor 23 is regarded as being in disorder, the acceleration measurement device 6 can detect the combustion vibration as to the combustor; in addition, in a case where at least two acceleration measurement devices 6 detecting the combustion vibrations are provided, whether or not there is a combustion vibration occurrence can be evaluated by the multiple devices 6 as a redundant system. Thus, the reliability of the estimation (judgment) as to the combustion vibration occurrence can be enhanced.

Back to the step 12 of FIG. 2, the explanation is continued. As described above, the frequency analysis is performed; when the process cycle in the step 12 is the second time cycle or more, and some adjustments have been done in the previous process cycle, then the effect of the adjustments on the operation condition is evaluated in the step S13. This evaluation is performed on the basis of the judgment whether or not further adjustments are immediately needed, by referring to predetermined thresholds, in view of the frequency analysis result (as to pressures or accelerations) obtained by the operation status grasping means 12; or the evaluation is performed on the basis of the judgment whether or not there is an indication to take countermeasures as to the combustion vibrations, by referring to predetermined thresholds, even though an immediate action is not needed.

If the above judgment is affirmative (YES at the step S13 of FIG. 2), namely, if the frequency analysis results are out of the threshold criteria or the frequency analysis results present an indication that some countermeasures are needed, then the contents regarding the adjustments done in the previous process cycle and the operation data changed by the adjustments are updated in the step S14; thereby, with the updated contents, the database 15 in FIG. 1(B) is renewed.

Suppose the process variables (including controllable and uncontrollable variables) are expressed with symbols $X_{11-1}, X_{11-2}, \ldots, X_{11-n}, X_{12-1}, X_{12-2}, \ldots, X_{22-n}; \ldots;$ and the maximum values of vibration strength in each frequency band are expressed with symbols $Y_{i1-1}, Y_{i1-2}, \ldots, Y_{i1-n}, Y_{i2-1}, Y_{i2-2}, \ldots, Y_{in-n}.$ In the database 15, the process variables as well as the vibration strength maximum values are stored; a maximum vibration strength $Y_{in}$ relates to the n-th frequency band and corresponding time point; the other suffix detail is explained in the following paragraphs. The data are generated at a series of time points t1, t2, tn, . . . ; and, the data are forwarded to the database 15 via the controller 8 and the frequency analyzing means 13; the new data generated time to time are memorized in the database or updates the database.

The vibration strength data accumulated in the database 15 may only include the pressure vibration data or the acceleration data; the accumulated data may include both the data. An example of data (including process variable data) accumulated in the database is shown in FIG. 7; thereby, at a time point t1, the opening of the bypass valve 35, the pilot ratio (the ratio of the pilot fuel flow rate to the main fuel flow rate or the total fuel flow rate), the ambient temperature, and the generator load (MW) are expressed with symbols $X_{11-1}$, $X_{12-1}$, $X_{21-1}$, and $X_{22-1}$, respectively; further, the maximum vibration strength in the first frequency band, the maximum vibration strength in the second frequency band, and the maximum vibration strength in the n-th frequency band are expressed with the symbols $Y_{i1-1}, Y_{i2-1},$ and $Y_{in-1}$, respectively; in similarly way, at a time point t2, the opening of the bypass valve 35, the pilot ratio (the ratio of the pilot fuel flow rate to the main fuel flow rate or the total fuel flow rate), the ambient temperature, and the generator load (MW) are expressed with symbols $X_{11-2}$, $X_{12-2}$, $X_{21-2}$, and $X_{22-2}$, respectively; further, the maximum vibration strength in the first frequency band, the maximum vibration strength in the second frequency band, and the maximum vibration strength in the n-th frequency band are expressed with the symbols $Y_{i1-2}, Y_{i2-2},$ and $Y_{in-2}$, respectively.

Thus, the data are added or renewed in the database 15; then, in the following step S15 (in FIG. 2), the computation as to the characteristics of the combustion vibration occurring in the combustor is performed; hereby, the computation means to make a formula model for modeling the combustion characteristics on the basis of the process variables inputted from the process variable measurement device 4 and the frequency analysis results inputted from the frequency analyzing means 13 as to the pressures and the accelerations per each frequency band, both the process variables and the frequency results being transferred in the database 15 through the combustion characteristic grasping means 14.

For instance, suppose that the number of the divided frequency bands is n, and the number of the combustors is m; then, the pressure variations are modeled in the following formula (1) of multiple regression analysis:

$$Y_{ij}=a_{ij,0}+a_{ij,1}\cdot X_{11}+a_{ij,2}\cdot X_{12}+a_{ij,3}\cdot X_{21}+a_{ij,4}\cdot X_{22} \quad (1),$$

whereby, $Y_{ij}$ means the maximum amplitude as to the i-th combustor and the j-th frequency band (i=1, 2, . . . , m; j=1, 2, . . . , n);

$X_{11}$ means the value as to an actuating variable 1 (the opening of the bypass valve 35 in this example);

$X_{12}$ means an actuating variable 2 (the pilot ratio in this example);

$X_{21}$ means an uncontrollable state variable 1 (an weather datum in this example);

$X_{22}$ means an uncontrollable state variable 2 (the generator output (MW) in this example); and, $a_{ij,0}, a_{ij,1}, a_{ij,2}, a_{ij,3}, a_{ij,4}$ are the coefficient parameters to be determined.

The combustion characteristic grasping means 14 computes the coefficients $a_{ij,0}, a_{ij,1}, a_{ij,2}, a_{ij,3}$, and $a_{ij,4}$ of the formula (1), by use of the data stored in the database 15 in order at the series of time points (t1, t2, . . . ), namely, by use of the values as to the maximum amplitudes $Y_{ij}$, the actuating variables $X_{11}$ and $X_{12}$, the uncontrollable state variables $X_{21}$ and $X_{22}$. In addition, the coefficients $a_{ij,0}, a_{ij,1}, a_{ij,2}, a_{ij,3}$, and $a_{ij,4}$ may be solved, for instance, by use of a least square method.

In the above description, in order to determine the maximum amplitudes $Y_{ij}$, the data measured by the pressure variation measurement device 5 and the acceleration measurement device 6 are A/D-transformed in the frequency analyzing means 13 at first; the frequency analysis regarding the digitalized data is performed by the frequency analyzing means 13; then, the analyzed data are classified into the divided frequency bands. In each frequency band, frequency analyzed data are collected during a certain time span (e.g. over the time points (t1, t2, . . . )); and, the maximum value of the collected data set regarding the j-th frequency band (as well as the i-th combustor) is the value $Y_{ij}$. FIG. 6 shows that the maximum amplitudes in the first, the second and the n-th bands are $Y_{i1}, Y_{i2}$ and $Y_{in}$, respectively.

In the above explanation, two actuating variables and two uncontrollable state variables are taken into consideration; as a matter of course, the selection of these variables are not limited to the above combination (i.e. two actuating variables and two uncontrollable state variables). Further, the polynomial formula of a higher degree instead of a linear expression in the equation (1) may be used in modeling the vibration model. Moreover, a non-linear model such as neural network models may be used. In the above example, the actuating variables $X_{11}$ and $X_{12}$, the uncontrollable state variables $X_{12}$ and $X_{21}$ are selected out of the measured data themselves; however, these variables may be of modified variables that are transformed from the directly measured data on the basis of pertinent transform rules such as the mass conservation law or a mathematical-physical law.

In the next place, the combustion characteristic grasping means 14 identifies the area where combustion vibrations are prone to occur, by use of the formula model (1) for each time point out of the series of time points (t1, t2, . . . ). For instance, suppose that an actuating variable 1, an actuating variable 2, an uncontrollable state variable 1, and an uncontrollable state variable 2 are $X'_{11}, X'_{12}, X'_{21}$, and $X'_{22}$, respectively. Thereby, the predicted value for the pressure variation in the i-th combustor, and in the j-th frequency band can be obtained as per the next equation (2).

$$Y'_{ij}=a_{ij,0}+a_{ij,1}\cdot X'_{11}+a_{ij,2}\cdot x'_{12}+a_{ij,3}\cdot X'_{21}+a_{ij,4}\cdot X_{22} \quad (2)$$

It is hereby noted that the coefficient parameters $a_{ij,0}, a_{ij,1}, a_{ij,2}, a_{ij,3}$, and $a_{ij,4}$ are already solved as described above, by use of, for instance, a least square method.

As shown in FIG. 6, the j-th frequency band for the i-th combustor (i=1, 2, . . . , m; j=1, 2, . . . , n) is provided with an allowable limit $Z_{ij}$ as to the vibration amplitude, in view of the structure of the i-th combustor 23 and the surrounding structures; namely, the thresholds $Z_{i1}, Z_{i2}, \ldots$, and $Z_{in}$, correspond to the frequency bands 1, 2, . . . , n, respectively; the thresholds $Z_{i1}, Z_{i2}, \ldots$, and $Z_{in}$ are the maximum allowable vibration strength for the j-th frequency band for the i-th combustor; the thresholds $Z_{i1}, Z_{i2}, \ldots$, and $Z_{in}$ are stored in the frequency analyzing means 13. These threshold values are determined, for example, based on whether or not there is a member or a structure that causes the resonance with the i-th combustor in the j-th frequency band, whether or not there is a member or a structure that is prone to be damaged around the i-th combustor, in the j-th frequency band, how high the vibration level threshold reaches regarding a member or a structure around the i-th combustor, and so on.

It is hereby considered how the actuating variables should be, when the above-described thresholds $Z_{i1}, Z_{i2}, \ldots$, and $Z_{in}$ are given. Hereby, attention is paid to the i-th combustor in the j-th frequency band; thereby, the vibration threshold is the already obtained value $Z_{ij}$ that is stored in the frequency analyzing means 13, and can be retrieved by the combustion characteristic grasping means 14. The following equation (3) can be taken into consideration, in relation to the variables $X'_{11}, X'_{12}, X'_{21}, X'_{22}$, and the value $Z_{ij}$ as a threshold value.

$$Z_{ij}=a_{ij,0}+a_{ij,1}\cdot X'_{11}+a_{ij,2}\cdot X'_{12}+a_{ij,3}\cdot X'_{21}+a_{ij,4}\cdot X_{22} \quad (3)$$

In the above equation (3), the variables $X'_{21}$, and $X'_{22}$ are the uncontrollable state variables that the controller 8 cannot manage to manipulate, namely, the variables $X'_{21}$, and $X'_{22}$ can be regarded as constants; thus, the unknowns in the equation (3) are only the two variables (the actuating variables) $X'_{11}$, and $X'_{12}$. Thus, the equation (3) becomes a relational expression between the two parameters $X'_{11}$, and $X'_{12}$. Therefore, the curve (or line) in a $(X'_{11}, X'_{12})$ plane can be easily obtained, thereby the coordinate pairs for the points on the curve satisfy the relation (3).

Further, It is hereby considered how the above-described curve (or line) is shifted in the $(X'_{11}, X'_{12})$ plane, when the threshold value $Z_{ij}$ is changed so that the value $Z_{ij}$ is multiplied by a plurality of gains $\alpha_k$ (k=1, 2, . . . , p) that can be given by the controller 8. When an $\alpha_k$ is given, the threshold $Z_{ij}$ is changed into $\alpha_k Z_{ij}$; thus, instead of the equation (3), the following equation (4) is taken into consideration.

$$\alpha_k Z_{ij}=a_{ij,0}+a_{ij,1}\cdot X'_{11}+a_{ij,2}\cdot X'_{12}+a_{ij,3}\cdot X'_{21}+a_{ij,4}\cdot X_{22} \quad (4)$$

Figure 8:
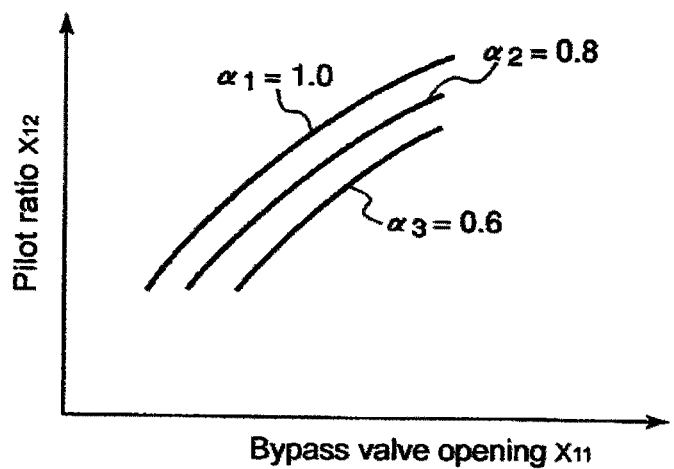
FIG. 8 shows a principle of the estimation method as to the combustion vibration zone.

Also by use of the above equation (4), a relational expression between the two parameters $X'_{11}$, and $X'_{12}$ can be solved in response to each given gain $\alpha_k$, as is the case with the equation (3); namely, corresponding to n gains $\alpha_k$ (k=1, 2, . . . , p), p curves (lines) are drawn in the two dimensional plane. An example for this consideration is depicted in FIG. 8. In FIG. 8, three curves (lines) corresponding to three gains 1.0, 0.8 and 0.6 are shown. In the case of FIG. 8, the upper side of each curve becomes an area where combustion vibrations are prone to occur (i.e. in the lower side area, the vibration is hard to happen), if the coefficient $a_{ij,2}$ is a positive number; on the contrary, the lower side of each curve becomes an area where combustion vibrations are prone to occur (i.e. in the upper side area, the vibration is hard to happen), if the coefficient $a_{ij,2}$ is a negative number. In other words, one side of the areas divided by the line (curve) corresponds to the stable area where the combustion vibrations are difficult to occur, while the other side corresponds to the unstable area where the combustion vibrations are easy to occur.

By paying attention to a threshold $Z_{ij}$ and a gain value $\alpha_k$ as well as paying attention to a frequency band and a combustor, it has been considered thus far that a curve (line) can be drawn in the $(X'_{11}, X'_{12})$ plane thereby one of the two areas divided the curve becomes a stable area as to the combustion vibrations.

When some multiple constraint conditions out of a plurality of thresholds $Z_{ij}$ (i=1, 2, ..., m; j=1, 2, ..., n) as well as gains $\alpha_k$ (k=1, 2, ..., p) are selected, then a plurality of curves (lines) are obtained so that the curves (lines) surround a stable operation region in the $(X'_{11}, X'_{12})$ plane; thereby, in the formed region, the combustion vibrations are not prone to occur. In this way, the combustion characteristic grasping means 14 makes use of the variables (signals from the controller 8) such as the maximum amplitude thresholds $Z_{ij}$, the gains $\alpha_k$, the actuating variables $X_{11}, X_{12}$, and the parameters $a_{ij,0}, a_{ij,1}, a_{ij,2}, a_{ij,3}$, and $a_{ij,4}$, so as to determine the regions where the operation is stable regarding the combustion vibrations.

Figure 9:
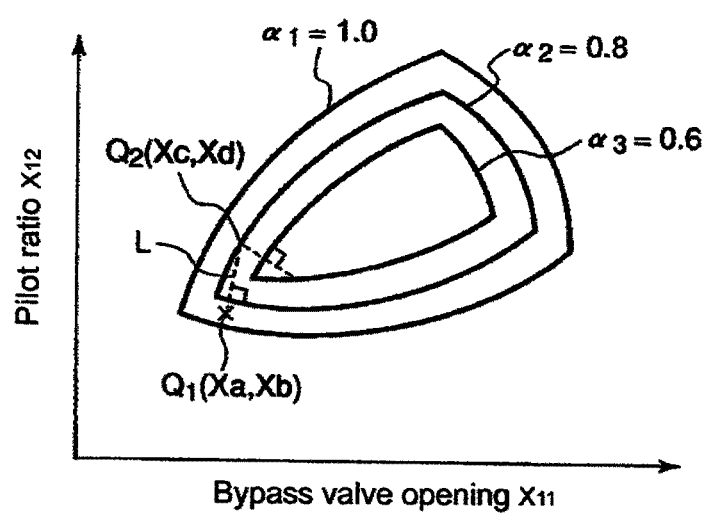
FIG. 9 shows an example of the estimated combustion vibration zone.

FIG. 9 shows an example of the combustion vibration regions determined by the combustion characteristic grasping means 14; whereby, the lateral axis and the vertical axis relate to the variables $X_{11}, X_{12}$, respectively. In this example, a plurality of the regions are formed thereby the boundary lines that surround the stable regions are formed with a set of contour lines depicted as such, in response to a plurality of the gains $\alpha_k$. The combustion vibrations are hard to occur at the middle in the regions surrounded by the contour lines, while being prone to occur in the neighborhood of the boundaries of the regions. In addition, for the sake of explanation convenience, FIG. 9 is expressed in a two-dimensional plane with regard to the two actuating variables. In a case where N actuating variables are taken into consideration, the stable regions are expressed in a N-th dimension space.

In the next place, the tuning parameter determining means 16 determines the countermeasures (i.e. adjusting locations (i.e. i and j) and adjusting amounts) in response to an operation adjustment order inputted by the operation status grasping means 12 so that the current operation status $(X_{11}=x_a, X_{12}=x_b)$ is adjusted. In a case where a plurality of maximum amplitudes $Y_{ij}$ exceeds the corresponding threshold $Z_{ij}$, in a plurality of the frequency bands, the adjustments are performed for and from a frequency band of a higher priority as per the priorities (priority list) assigned in a basic data section (not shown) of the database 15; thereby, the basic data section stores information about the mathematical model which is obtained through the frequency analysis results for the operation data collected from the same type gas turbines 2 that are already commissioned and in service, the model representing the standard combustion characteristics of the gas turbine; further, the basic data section stores information about the operation constraints or the limiting values (e.g. the air-fuel ratio limitation to evade misfires or back-fires) in operating the gas turbine 2. As an example in this context regarding the priorities, a highest priority is placed on the lowest frequency band; and the following priorities are placed on the higher frequency bands (e.g. one after another from the highest frequency band). The reason of this argument as to the priorities is that chances are high that the combustion in the combustor extinguishes because of the combustion vibrations in the lowest frequency band; further, in the higher frequency bands, the energy levels with regard to the combustion vibrations are higher, and the combustion vibrations are remarkably prone to cause damages to the combustor or the members around the combustor.

Further, after selecting the frequency band in which the adjustments are performed, the tuning parameter determining means 16 determines which direction the current operation status $(X_{11}=x_a, X_{12}=x_b)$ is to be adjusted, by use of an optimization approach such as a steepest ascent/descent method. It is noted that the optimization approach is not limited to this steepest ascent/descent method.

In consultation with FIG. 9 obtained (determined) by the combustion characteristic grasping means 14, the tuning parameter determining means 16 depicts an assumed direction line (a virtual line) as follows; for instance, in FIG. 9, there are three contour lines L6, L8, L10 in response to the gain parameters $\alpha_{0.6}, \alpha_{0.8}, \alpha_{1.0}$; suppose the current operation status is located at a point $Q_1$ $(X_{11}=x_a, X_{12}=x_b)$ between the contour lines L10 and L8; a virtual line L is drawn from the point $Q_1$ toward the inner side contour line L8 so that the virtual line L lies at right angles to the inner side contour line L8; the direction from the point $Q_1$ to the crossing point of the lines L and L8 is the direction to be sought for. In the next place, if the direction line from the point $Q_1$ toward the crossing point of the lines L and L8 does not intersect with the further inner side contour line L6, then the direction line is extended till it cross the contour line L8 at a point Q2 $(X_{11}=x_c, X_{12}=x_d)$ on the contour line (boundary) L8; successively, the next virtual line L is drawn from the point $Q_2$ toward the further inner side contour line L6. Thus, the tuning parameter determining means 16 determines the direction (vector direction) as to the control adjustments.

It is hereby noted that the adjustment amount or increment corresponding to an infinitesimal time increment may be determined by different control orders or the gas turbine governor system (and the adjustment settings of the governor system).

In a case where the combustion characteristic grasping means 14 cannot sufficiently recognize the combustion characteristics, the tuning parameter determining means 16 can determine the above-described adjustment direction on the basis of the information data of a knowledge database (not shown) in the database 15; the knowledge database accumulates the information data as to the previously performed adjustments and the resulting operation status changes in the gas turbine 2; in a case where the data base 15 has not sufficiently accumulate the information data just after the gas turbine 2 is commissioned, the tuning parameter determining means 16 can determine the direction, on the basis of the standard mathematical formulae as to the combustion characteristics, the constraint data and the learned information in the basic database or the knowledge database. In addition, the knowledge database may store (include) the learned information data that are established based on the experience of the skilled operators; namely, the learned information data relate to the "symptoms and signs" that the skilled operators have recognized, and the effective countermeasures in response to the "symptoms and signs."

Moreover, in performing the above-described adjustments, the tuning parameter determining means 16 can take an adjustment in response to the combustion condition from moment to moment into consideration, on the basis of the data as to the combustion characteristics the data which is obtained by the operation status grasping means 12, via the input means 11. These information data stored in the basic database and the knowledge database as well as the resulting operation status changes in the gas turbine 2 are evaluated in the steps S13 to S14 in the following process cycle, and accumulated (incorporated) in the database 15; if the information data from moment to moment differ from the already stored learned-information data, then the learned-information data in the database are updated.

In the next place, the output means 17 outputs the data as to the adjustment direction determined by the tuning parameter determining means 16, toward the controller 8, in the step S17 in FIG. 2; thus, based on the just described data, the controller 8 controls the maneuvering mechanism 7 so as to operates the main fuel (flow rate) control valve 28, the pilot fuel (flow rate) control valve 31, the bypass valve 35, and the inlet guide vane 26, in order that the opening $X_{11}$ of the bypass valve and the pilot ratio $X_{12}$ are adjusted (changed in the adjustment direction). In other words, based on the adjustment order that the adjustment direction is directed from the point $Q_1$ to the point $Q_2$ according to the information inputted by the output means 17, the controller 8 controls at least one of the main fuel (flow rate) control valve 28, the pilot fuel (flow rate) control valve 31, the bypass valve 35, and the inlet guide vane 26, so that the bypass valve opening $X_{11}$ is shifted from the coordinate $x_a$ to the coordinate $x_c$, as well as, the pilot ratio $X_{12}$ is shifted from the coordinate $x_b$ to the coordinate $x_d$.

Further, in a case where there is a successive adjustment order that the adjustment direction is directed along an imaginary line L passing through the point $Q_2$, the bypass valve opening $X_{11}$ and the pilot ratio $X_{12}$ are shifted in a way similar to the above. It is noted that the pilot ratio $X_{12}$ hereby means the ratio of the flow rate of the pilot fuel to the flow rate of the total fuel flow rate; namely, the pilot ratio is defined as (the pilot fuel flow rate/(the pilot fuel flow rate+the main fuel flow rate)). Further, in increasing the pilot ratio $X_{12}$, the controller 8 can increase the ratio by reducing the total fuel flow rate without changing the pilot fuel flow rate, or by increasing the pilot fuel flow rate without changing the total fuel flow rate.

On the other hand, in the step S13 where the operation data are compared with control criteria or thresholds, if the operation status is in order (within the control criteria) and no indication as to the combustion vibrations appears, then the step S13 is followed by the step S18; at the step S18, it is judged on the basis of the process variables measured by the process variable measurement device 4, whether or not there is a change regarding the operation (condition or status) parameters between the former process cycle and the current process cycle, namely, whether or not at least one of the fuel flow rate or the air flow rate supplied to the combustor 23 is adjusted (amended). As a consequence, if there is no change in the operation status, then the step S18 is followed by the step S20. If the there is a change among the operation parameters, then the step S18 is followed by the step 20, after the operation data (parameters) in the previous process cycle and the current process cycle are renewed or added in the step S19 similarly as done in the step 14; the renewed or added operation status data are stored in the database 15 (in FIG. 1(B)).

Further, in the step S20, as is the case in the step S13, on the basis of the frequency analysis result (as to pressures or accelerations) obtained by the operation status grasping means 12, it is judged whether or not the measured combustion vibrations are stable vibrations requiring no adjustment; if it is judged that the operation status is not stable and some adjustments are needed, or if it is judged that there is an indication of the combustion vibrations and some adjustments are needed, then the process of the step 20 returns back to the step 11 from which the series of processes along the loops as explained thus far are repeated. On the other hand, if it is judged that the operation status is stable, the step S20 is followed by the step S21; thereby, the data regarding the adjustment direction that is outputted (by tuning parameter determining means 16) in the step 17 of the previous process cycle is reset (namely, the memory data regarding the adjustment direction is reset in null); in other words, a "reset as to the adjustment order" is performed in the step S21. In addition, the thresholds used in the step 20 may be on the safety side in comparison with the thresholds in the step S13.

If combustion vibrations happen even in a case where there is no indication as to the combustion vibrations and the combustion in the combustor is stable owing to the adjustment control, then there is a possibility that the appearing combustion vibrations may be unexpectedly caused by the change in weather conditions or the change in the thermal load (due to the required power or the aged deterioration) on the gas turbine. Further, there is a possibility that the appearing combustion vibrations may be attributable to the deviations (or the accumulation of adjustments) from the ideal operation conditions at the design stage of the gas turbine; thereby, in the design stage, an ideal fuel flow rate or air flow rate for the gas turbine is taken into consideration.

Thus, by incorporating the above-described reset practice, the present invention can provide a gas turbine control method and a device thereof whereby the gas turbine is prevented from continuing an abnormal operation in which the fuel flow rate or air flow rate deviates from the ideal condition that is assumed in the design stage.

Second Embodiment

Thus far, the explanation has been given about the first embodiment whereby the reset practice is incorporated so that adjusted variables return back to the initial condition, in a case where the gas turbine operation is performed at an operating point deviating from a regular operation point that is determined at the design stage of the gas turbine based on the assumed ideal fuel flow rate or air flow rate to satisfy design performance requirements. In this approach, however, a deterioration factor such as a gas turbine life consuming deterioration is not taken into consideration; thus, the operation variables (i.e. actuating variables) return back to the initial settings thereof, even when the current operation point deviates from the initial ideal operation point due to the life consuming or aging of the gas turbine 2. Hence, in the following second embodiment of this invention, the adjustment approach to solve this problem is disclosed.

Figure 3:
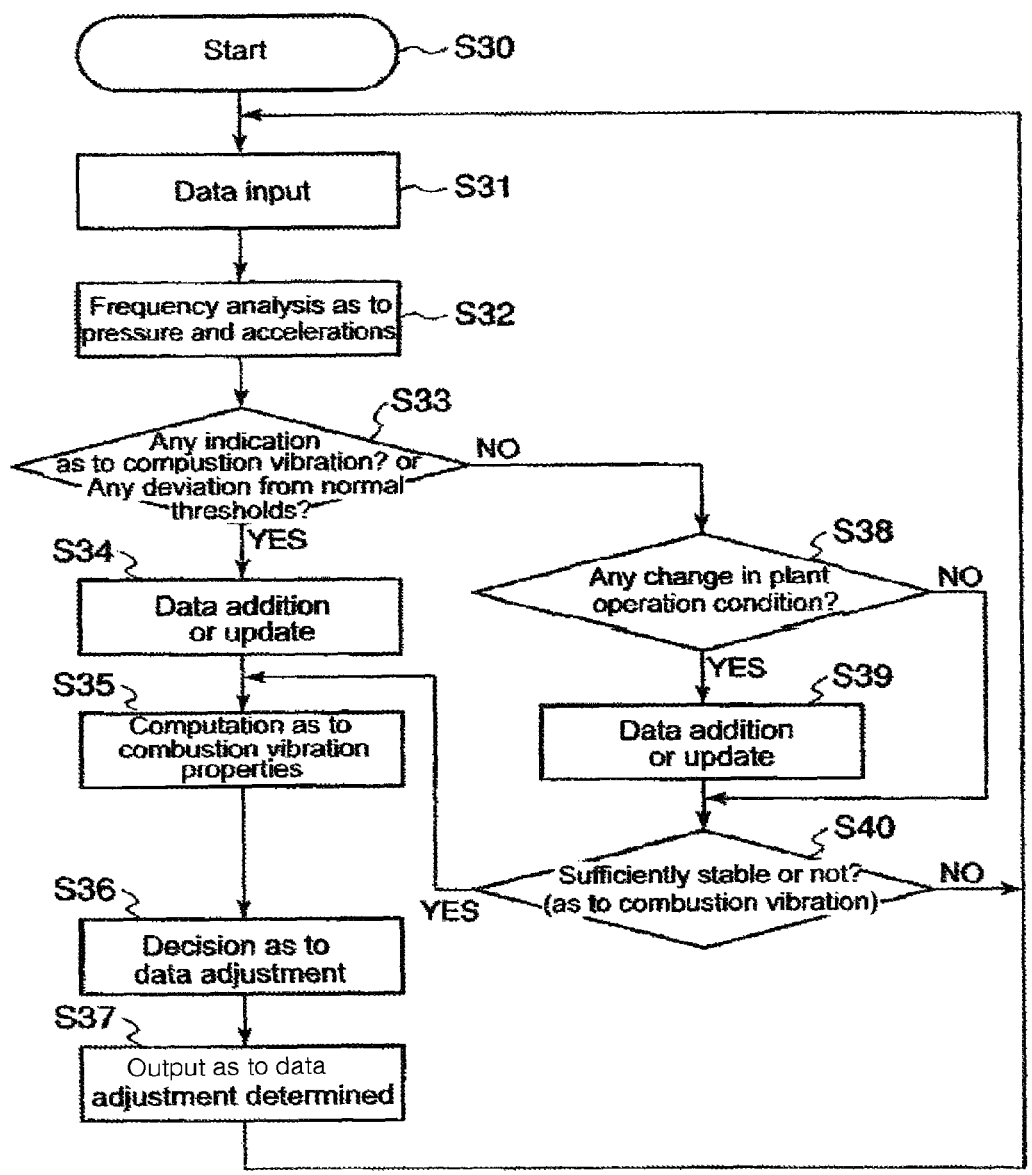
FIG. 3 shows a flow diagram as to a gas turbine control method of a second embodiment according to the present invention.

FIG. 3 shows a flow diagram as to the gas turbine control method according to the second embodiment. In the flow diagram of FIG. 3, the steps S30 to S40 are the same as the steps S10 to 20 in FIG. 2 as to the first embodiment; in FIG. 3, however, a step corresponding to the step 21 performing a "reset as to the adjustment order" in FIG. 2 is deleted; another major difference is that the step S40 (in FIG. 3) in which whether or not the appearing combustion vibrations are stable is estimated returns back to the step S35 (corresponding to the step S15 in FIG. 2), if the estimation in the step 40 is affirmative.

As in the case with the stream from the step 10 to the step S17 (in FIG. 2), in the steps S30 to S37 (in FIG. 3), an indication (if any) as to the combustion vibrations is judged (estimated) in the step S33; further, in steps S34 to S37, the computation as to the combustion vibration characteristics and the variable adjustments are performed; also in steps S34 to S37, the output as to the variable adjustment are performed; if there is found neither indication as to the combustion vibrations nor operation deviation out of the control criteria in the step S33, the step 33 is followed by the step S38 whereby it is judged on the basis of the process variables measured by the process variable measurement device 4, whether or not there is a change regarding the operation (condition or status) parameters between the former process cycle and the current process cycle, namely, whether or not at least one of the fuel flow rate or the air flow rate supplied to the combustor 23 has been adjusted (amended). As a consequence, if there is no change in the operation status, then the step S 38 is followed by the step S40. If the there is a change among the operation parameters, then the step S38 is followed by the step 40, after the operation data (parameters) in the previous process cycle and the current process cycle are renewed or added in the step S 39 similarly as done in the step 34; the renewed or added operation status data are stored in the database 15 (in FIG. 1(B)).

Further, in the step S40, as is the case in the step S33, on the basis of the frequency analysis result (as to pressures or accelerations) obtained by the operation status grasping means 12, it is judged whether or not the measured combustion vibrations are stable vibrations requiring no adjustment; if it is judged that the operation status is not stable and some adjustments are needed, or if it is judged that there is an indication of the combustion vibrations and some adjustments are needed, then the process of the step 40 returns back to the step 31 from which the series of processes along the flow loops are repeated. On the other hand, if it is judged that the operation status is stable, the step 40 jumps to the step 35. In addition, the thresholds used in the step 40 may be on the safety side in comparison with the thresholds in the step S33.

Figure 4:
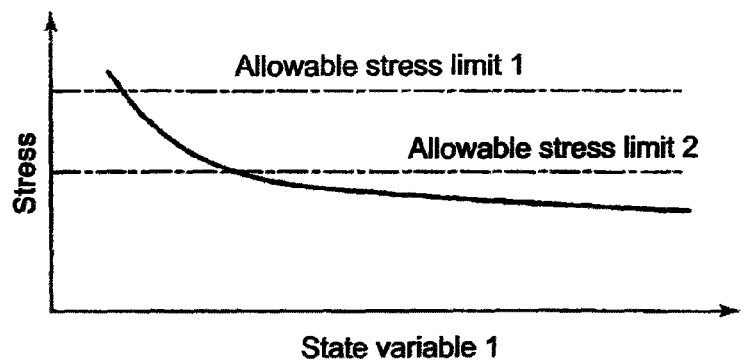
FIG. 4 is a graph explaining that a plurality of thresholds as to the operation zone limits of the gas turbine
  in preserving the correction factors reduced in number the factors which are used for restraining the occurrence of the combustion vibrations.

When the process of the loop comes again to the step S35, the computations as to the combustion vibration characteristics are performed; suppose that the appearing combustion vibrations accompany some stress conditions loaded on the combustor 23; for instance, it is supposed that the combustor 23 is considerably heated up at its local area while the combustion vibrations is occurring; then, it is taken into consideration that a threshold line I as a usual allowable limit 1 is replaced by another stricter threshold line II as a safer side allowable limit 2 (cf. FIG. 4); namely, the allowable stress limit 1 is reduced to the stricter (safer side) allowable stress limit 2 as shown in FIG. 4, in consideration of the life consuming or the aging of the gas turbine 2; for instance, if the allowable stress limit 1 is derived from a design concept that the fatigue stress limit (the allowable stress limit 1) of the used material set at the 90% level of the limit temperature in the design stage in order to evade possible combustion vibrations, then the allowable stress limit 1 should be reduced to a lower fatigue stress limit (the allowable stress limit 2), in consideration of the life consuming or the aging of the gas turbine, on the condition that the gas turbine operation status can be sufficiently stable by use of the threshold criteria. Thus, in the step S36, the actuating variable adjustments are determined under a condition of the stricter threshold line II as a safer side allowable limit 2; and, in the step S37, the determined variable adjustments are outputted.

In the way as described, when the combustion vibrations occur, the desirable adjustments as to the control system's settings are once performed so as to restrain the combustion vibration; then, the operation status grasping means 12 watches the gas turbine for a predetermined time span; if it is judged that the operation is stable, the life (in a long time scale of the gas turbine) is estimated; and, if the life time is judged to be deteriorated in comparison with the initially assumed expected life, the current control settings are returned toward the initial design settings or toward the control settings in which the deviation of the operation point due to the machine aging is taken into consideration, so as to not remarkably spoil the initially expected life.

According to the second embodiment, the control method and device perform the adjustments as to the control system's settings so that the combustion stability is achieved in a case where the unstable combustion occurs due to the temporary unstable phenomena attributable to the thermal load or capacity of the gas turbine body 21, as well as due to the time deterioration of the gas turbine; further, according to the control method and the device, the gas turbine can be operated at a high efficiency, by gradually returning the control system settings back to the initial settings while estimating the life of the gas turbine, in a case where the appeared unstable phenomena are restrained by the control method or the device.

As the various aspects of the present invention are described thus far, the gas turbine control method and device for evading combustion vibrations once perform desirable adjustments as to the control system's settings when the combustion vibrations occur; when the operation is stable while the gas turbine is watched for a predetermined time span, the control system's settings during operation are returned back to the initial settings of the system, or the control system's settings are changed so as to take the fatigue life of the gas turbine into consideration; thus, the control method and device is provided with the functions as described above; therefore, the adjustments as to the control system of the gas turbine can be performed so that the combustion stability is achieved in a case where the unstable combustion occurs due to the temporary unstable phenomena attributable to the thermal load or capacity of the gas turbine; further, the adjustments as to the control system of the gas turbine can be performed so that the control settings during operation are returned back to the initial settings of the system, or the control system's settings during operation are changed so as to take the fatigue life of the gas turbine into consideration.

In this way, the gas turbine control device is provided with a function for operating the gas turbine under the control system settings as per the intention of the customers and the manufacture, except for special operation conditions (or optional requirements).

Thus, a gas turbine control method and a device thereof can be realized; whereby, the turbine is prevented from continuing an abnormal operation in which the fuel flow rate or air flow rate deviates from the ideal condition (or standard operating points/standard operating line) that is assumed in the design stage; and, the operation status is maintained on the basis of the consideration for the fatigue life of the gas turbine.

INDUSTRIAL APPLICABILITY

A gas turbine control method and a device thereof is provided whereby the designed efficiency of the initial delivery stage can be maintained for a long time span, and the generator driven by the gas turbine can be efficiently brought into active use without waste of fuel consumption.

The invention claimed is:
1. A gas turbine control method, comprising:
a first step of analyzing pressure fluctuations or accelerations as to combustors in the gas turbine, at each of a plurality of frequency bands over the whole combustion vibration frequency range of the gas turbine;
a second step of grasping characteristics relating to the combustion vibrations in the gas turbine, at each of the frequency bands, on the basis of the analysis results obtained by the first step, as well as, on the basis of status signals including the information data regarding actuating variables comprising airflow rate and pilot ratio, namely the ratio of the pilot fuel flow rate to the total fuel flow rate in the gas turbine, as well as, regarding state variables comprising atmospheric condition variables and load index variables in the gas turbine;

a third step of computing adjustment increments regarding at least one of the airflow rate into the combustor and the pilot ratio, and making revisions to the actuating variables comprising the airflow rate and the pilot ratio so that the actuating variables are contrasted with the status signals and the variables are modified against initial design conditions, every moment the level of the combustion vibration exceeds a predetermined control criterion; and a fourth step of issuing orders as to the adjustment increments computed in the third step so as to operate the gas turbine, and judging that an unstable phenomenon has disappeared when the level of the combustion vibration is restrained below the predetermined control criterion for a predetermined time span;

wherein, on the basis of the judgment result in the fourth step, the gas turbine is operated under the conditions that the revisions according to the third step are reset; and the gas turbine is operated under the control settings of the initial design stage.

2. A gas turbine control method, comprising:

a first step of analyzing pressure fluctuations or accelerations as to combustors in the gas turbine, at each of a plurality of frequency bands over the whole combustion vibration frequency range of the gas turbine;

a second step of grasping characteristics relating to the combustion vibrations in the gas turbine, at each of the frequency bands, on the basis of the analysis results obtained by the first step, as well as, on the basis of status signals including the information data regarding actuating variables comprising airflow rate and pilot ratio, namely the ratio of the pilot fuel flow rate to the total fuel flow rate in the gas turbine, as well as, regarding state variables comprising atmospheric condition variables and load index variables in the gas turbine;

a third step of computing adjustment increments regarding at least one of the airflow rate into the combustor and the pilot ratio, and making revisions to the actuating variables comprising the airflow rate and the pilot ratio so that the actuating variables are contrasted with the status signals and the variables are modified against initial design conditions, every moment the level of the combustion vibration exceeds a predetermined control criterion; and a fourth step of issuing orders as to the adjustment increments computed in the third step so as to operate the gas turbine, and judging that an unstable phenomenon has disappeared when the level of the combustion vibration is restrained below the predetermined control criterion for a predetermined time span;

wherein on the basis of the judgment result in the fourth step, the gas turbine is operated under the condition where control settings are revised according to the third step so as to return the control settings back to initial design settings step by step.

3. The gas turbine control method according to claim 2, wherein the level of the combustion vibration is restrained below a stricter criterion that is stricter than the initially predetermined criterion for each frequency band, the stricter criterion being formed with a plurality of stricter thresholds that are smaller than the initially predetermined thresholds, for the frequency bands.

4. A gas turbine control device, comprising:

a frequency analyzing means that analyzes pressure fluctuations or accelerations as to combustors in the gas turbine, at each of a plurality of frequency bands over the whole combustion vibration frequency range of the gas turbine;

an operation status grasping means that grasps combustion status in the gas turbine, on the basis of the analysis results obtained by the frequency analyzing means, as well as, on the basis of status signals including information data regarding actuating variables comprising airflow rate and pilot ratio, namely the ratio of the pilot fuel flow rate to the total fuel flow rate in the gas turbine, as well as, regarding state variables comprising atmospheric condition variables and load index variables in the gas turbine;

a combustion characteristic grasping means that grasps characteristics relating to the combustion vibrations in the gas turbine, on the basis of the analysis results obtained by the frequency analyzing means, as well as, on the basis of the status signals including the information data regarding the actuating variables comprising the airflow rate and the pilot ratio in the gas turbine, as well as, regarding the state variables comprising the atmospheric condition variables and the load index variables in the gas turbine; and a gas turbine control unit for the gas turbine operation control that computes adjustment increments regarding at least one of the airflow rate into the combustor and the pilot ratio, and makes revisions to the actuating variables comprising the airflow rate and the pilot ratio so that the actuating variables are contrasted with the status signals and the variables are modified toward initial design conditions, every moment the level of the combustion vibration exceeds a predetermined control criterion, on the basis of the combustion vibration characteristics grasped by the combustion characteristic grasping means and the combustion status grasped by the operation status grasping means;

wherein, the gas turbine control unit resets the revisions made to the actuating variables in a case where the gas turbine control unit judges that an unstable phenomenon has disappeared when the level of the combustion vibration is restrained below the predetermined control criterion for a predetermined time span, and the gas turbine is operated under the control settings of the initial design stage.

5. A gas turbine control device, comprising:

a frequency analyzing means that analyzes pressure fluctuations or accelerations as to combustors in the gas turbine, at each of a plurality of frequency bands over the whole combustion vibration frequency range of the gas turbine;

an operation status grasping means that grasps combustion status in the gas turbine, on the basis of the analysis results obtained by the frequency analyzing means, as well as, on the basis of status signals including information data
  regarding actuating variables comprising airflow rate and pilot ratio, namely the ratio of the pilot fuel flow rate to the total fuel flow rate in the gas turbine, as well as,
  regarding state variables comprising atmospheric condition variables and load index variables in the gas turbine;
a combustion characteristic grasping means that grasps characteristics relating to the combustion vibrations in the gas turbine, on the basis of the analysis results obtained by the frequency analyzing means, as well as, on the basis of the status signals including the information data
  regarding the actuating variables comprising the airflow rate and the pilot ratio in the gas turbine, as well as,
  regarding the state variables comprising the atmospheric condition variables and the load index variables in the gas turbine; and
a gas turbine control unit for the gas turbine operation control that
  computes adjustment increments regarding at least one of the airflow rate into the combustor and the pilot ratio, and
  makes revisions to the actuating variables comprising the airflow rate and the pilot ratio so that the actuating variables are contrasted with the status signals and the variables are modified toward initial design conditions,
  every moment the level of the combustion vibration exceeds a predetermined control criterion,
  on the basis of the combustion vibration characteristics grasped by the combustion characteristic grasping means and the combustion status grasped by the operation status grasping means;
wherein
the gas turbine control unit makes the revisions to the actuating variables so that the gas turbine is operated under a condition where the revisions made to the control settings return back the control settings closer to initial design settings step by step, in a case where the gas turbine control unit judges that an unstable phenomenon has disappeared when the level of the combustion vibration is restrained below the predetermined control criterion for a predetermined time span.

6. The gas turbine control device according to claim 5, wherein
  the combustion vibration is restrained below a stricter criterion that is stricter initially predetermined criterion, the stricter criterion being formed with a plurality of stricter thresholds that are smaller than the initially predetermined thresholds, for the frequency bands.

* * * * *